United States Patent
Madsen et al.

(10) Patent No.: US 10,990,075 B2
(45) Date of Patent: Apr. 27, 2021

(54) CONTEXT SENSITIVE RELATIONAL FEATURE/MEASUREMENT COMMAND MENU DISPLAY IN COORDINATE MEASUREMENT MACHINE (CMM) USER INTERFACE

(71) Applicants: Mitutoyo Corporation, Kanagawa-ken (JP); Mitutoyo Europe GmbH, Neuss (DE)

(72) Inventors: Frank Uwe Madsen, Oberndorf am Neckar (DE); Samuel Wu, Upland, CA (US); Eric Yeh-Wei Tseo, Kirkland, WA (US); Tobias Friedrich, Braeunlingen (DE)

(73) Assignees: Mitutoyo Corporation, Kanagawa-ken (JP); Mitutoyo Europe GmbH, Neuss (DE)

(*) Notice: Subject to any disclaimer, the term of this patent is extended or adjusted under 35 U.S.C. 154(b) by 1169 days.

(21) Appl. No.: 15/277,141

(22) Filed: Sep. 27, 2016

(65) Prior Publication Data
US 2018/0089360 A1 Mar. 29, 2018

(51) Int. Cl.
*G05B 19/401* (2006.01)
*G01B 21/04* (2006.01)

(52) U.S. Cl.
CPC ......... *G05B 19/401* (2013.01); *G01B 21/047* (2013.01); *G05B 2219/37443* (2013.01); *G05B 2219/37453* (2013.01)

(58) Field of Classification Search
CPC ........ G05B 19/401; G05B 2219/37443; G05B 2219/37453; G01B 21/047
See application file for complete search history.

(56) References Cited

U.S. PATENT DOCUMENTS 4,901,253 A 2/1990 Iwano et al.
4,908,951 A 3/1990 Gurny
(Continued)

OTHER PUBLICATIONS

Lindeberg, T. (1998). Edge detection and ridge detection with automatic scale selection. International journal of computer vision, 30(2), 117-156. (Year: 1998).*
CMMXYZ, "PC-DMIS 2011: Power and Simplicity Webinar | CMM E-Learning—CMM Inc." From Approx 57:25 for an example of the "dimension toolbar," retrieved from URL=https://www.youtube.com/watch?v=RiJKYyzxklc, (Screenshots and Transcript Included, 62 pages), 2011.
(Continued)

*Primary Examiner* — Bijan Mapar
(74) *Attorney, Agent, or Firm* — Seed IP Law Group LLP

(57) ABSTRACT

A system is provided for programming workpiece feature inspection operations for a coordinate measuring machine. The system includes a computer-aided design (CAD) file processing portion, a geometric relationship analyzer, an inspection motion path generation portion, and a user interface including an editable plan representation of a current workpiece feature inspection plan, a workpiece inspection program simulation portion configured to display a 3D view including geometric features and inspection operation representations, and a context sensitive menu portion. The context sensitive menu portion displays a context sensitive relational command menu that indicates a valid set of relational commands including relational feature or relational measurement commands operable to define a corresponding constructed feature or corresponding relational measurement operation to be included in the current workpiece feature inspection plan. The valid set of relational commands is determined based on a concurrently selected geometric feature set including at least two geometric features concurrently selected and indicated in the user interface.

25 Claims, 14 Drawing Sheets

(56) References Cited

U.S. PATENT DOCUMENTS

| | | | |
|---|---|---|---|
| 5,465,221 A | 11/1995 | Merat et al. | |
| 5,471,406 A | 11/1995 | Breyer et al. | |
| 5,815,154 A * | 9/1998 | Hirschtick | G06T 19/20 |
| | | | 715/853 |
| 6,888,542 B1 * | 5/2005 | Clauss | G06F 30/00 |
| | | | 345/420 |
| 7,058,472 B2 | 6/2006 | Mathews et al. | |
| 7,146,291 B2 | 12/2006 | Hough | |
| 7,652,275 B2 | 1/2010 | Gladnick | |
| 7,783,445 B2 | 8/2010 | McLean et al. | |
| 8,302,031 B1 | 10/2012 | Sang | |
| 8,438,746 B2 | 5/2013 | Usui | |
| 2014/0129503 A1 * | 5/2014 | Yang | G06N 5/02 |
| | | | 706/46 |
| 2015/0169790 A1 * | 6/2015 | Tseo | G05B 19/41875 |
| | | | 700/98 |

OTHER PUBLICATIONS

Yu et al., "Inspection Program Editing Environment Including Real-Time Feedback Related to Throughput," U.S. Appl. No. 14/682,976, filed Apr. 9, 2015, 47 pages.

Yu et al., "Inspection Program Editing Environment With Simulation Status and Control Continually Responsive to Selection Operations," U.S. Appl. No. 14/702,538, filed May 1, 2015, 65 pages.

Yu et al., "Inspection Program Editing Environment With Editing Environment Automatically Globally Responsive to Editing Operations in Any of its Portions," U.S. Appl. No. 14/703,814, filed May 4, 2015, 70 pages.

ZEISS Industrial Metrology US, "CALYPSO Software Demonstration," from Approx. 3:29 where an example use of a tool is started, retrieved from URL=http://www.youtube.com/watch?v=nA8hmlNPj98, (Transcript Included, 9 Pages), 2011.

* cited by examiner

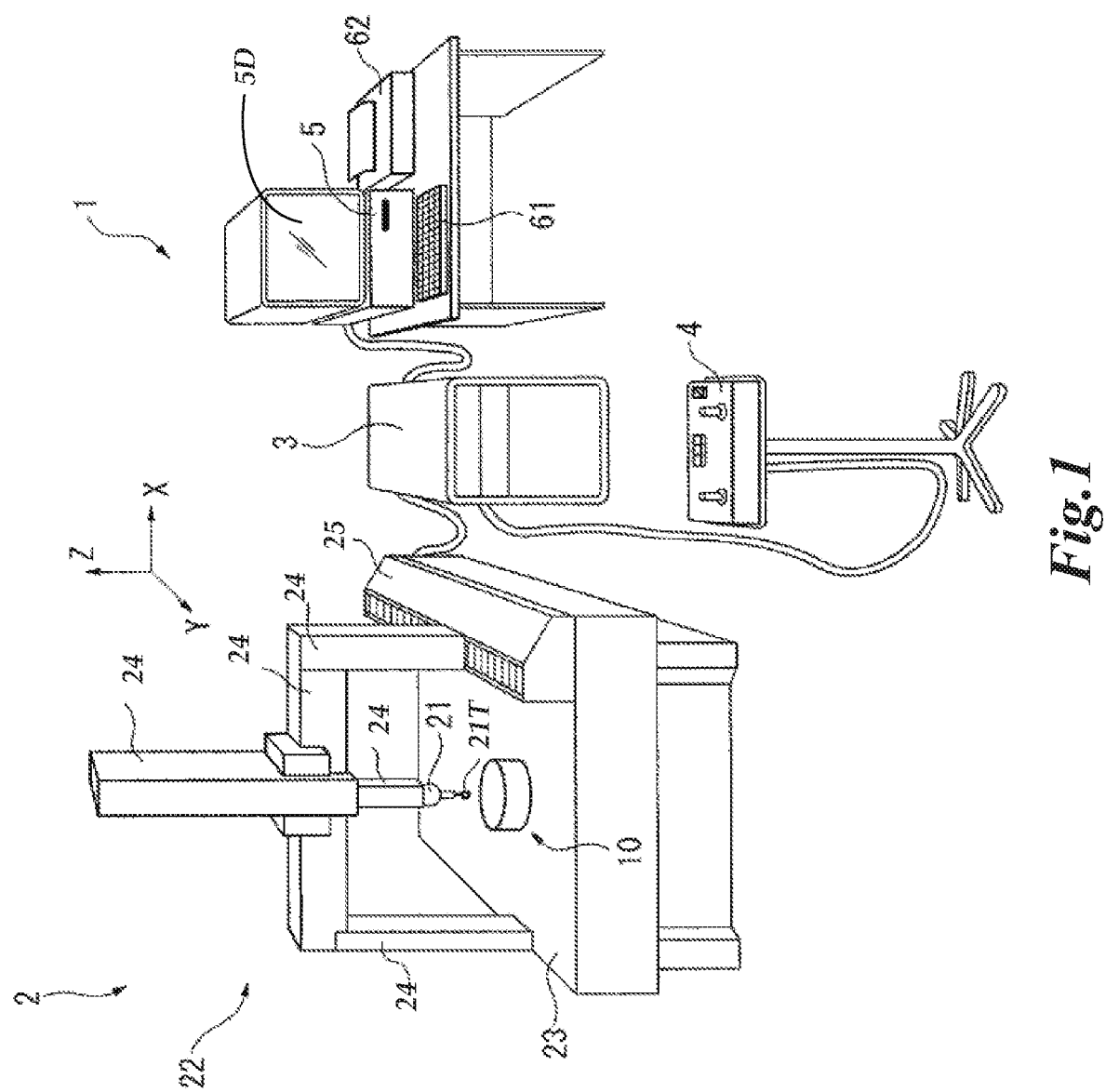

CONTEXT SENSITIVE RELATIONAL FEATURE/MEASUREMENT COMMAND MENU DISPLAY IN COORDINATE MEASUREMENT MACHINE (CMM) USER INTERFACE

BACKGROUND

Technical Field

This disclosure relates to precision metrology, and more particularly to inspection programs for coordinate measuring machines.

Description of the Related Art

Certain metrology systems including coordinate measurement machines (CMMs) can be utilized to obtain measurements of inspected workpieces and may be controlled at least in part by workpiece feature inspection operations that have been programmed on a computer. One exemplary prior art CMM is described in U.S. Pat. No. 8,438,746 ("the '746 patent"), which is incorporated herein by reference in its entirety. As described in the '746 patent, the CMM includes a probe for measuring a workpiece, a movement mechanism for moving the probe, and a controller for controlling the movement mechanism.

A CMM which includes a surface scanning probe is described in U.S. Pat. No. 7,652,275, which is incorporated herein by reference in its entirety. After a scan, a three dimensional profile of the workpiece is provided. The workpiece may be measured by a mechanical contact probe scanning along the workpiece surface, or by an optical probe which scans a workpiece without physical contact. Optical probes may be of a type that may use points of light for detecting surface points (such as triangulation probes), or a type that uses a video camera, wherein the coordinates of geometric elements of the workpiece are determined via image processing software. A "combined" CMM that uses both optical and mechanical measuring is described in U.S. Pat. No. 4,908,951, which is incorporated herein by reference in its entirety.

In all of the above described CMMs, operations may be programmed for inspecting workpiece features. The workpiece features and certain CMM components may be represented in computer aided design (CAD) files. The programmed operations for inspecting the workpiece features may generally be reviewed to see which workpiece features are being inspected and in what order, and may also be edited by adding, removing or otherwise altering particular program operations that are associated with particular workpiece features. The applicant of the present patent application has previously disclosed innovative techniques to make such programming, reviewing and editing operations easy for a user to perform or to understand, such that the user may readily program CAD models for workpiece features and/or CMM components in CMM programming systems. See, co-assigned U.S. patent application Ser. No. 14/682,976, filed Apr. 9, 2015, titled "Inspection Program Editing Environment Including Real-Time Feedback Related to Throughput", Ser. No. 14/702,538, filed May 1, 2015, titled "Inspection Program Editing Environment with Simulation Status and Control Continually Responsive to Selection Operations", and Ser. No. 14/703,814, filed May 4, 2015, titled "Inspection Program Editing Environment with Editing Environment Automatically Globally Responsive to Editing Operations in Any of its Portions," all of which are explicitly incorporated herein by reference. Briefly, in those CMM programming systems disclosed in applicant's prior applications, a 3D view window that displays a CAD model, an editable plan view window that allows user editing of a workpiece feature inspection plan organized in terms of workpiece features to be inspected, and a program view window that allows user editing of program pseudo-code, actual code or their graphical representations, are linked together. The three user interface windows are configured to be automatically globally responsive to editing operations performed in any of the three windows. Thus, when edits or changes are applied in any of the windows, the other two windows are automatically cross-updated to present a coherent feedback, in real time, to the user performing the editing in one of the windows. Accordingly, the user may readily track where and how such programmed operations fit within an overall inspection plan or to understand the various effects that certain types of edits may produce relative to the inspection of a particular workpiece feature or for the overall inspection plan.

A need exists for a system and a method that further simplify programming, reviewing and editing operations of CMM workpiece feature inspection programs.

BRIEF SUMMARY

Currently available CMM programming systems provide a tool-bar user interface, in which multiple video tools, or tools for short, are presented for user selection. A typical tool bar may include, for example, a distance tool configured to measure a distance between two workpiece features, an angularity tool configured to measure an angle between two lines or planes, a roundness tool configured to measure roundness of a cylinder or circle, a flatness tool configured to measure flatness of a surface, a concentricity tool configured to measure concentricity of cylinders or circles, a parallelism tool configured to measure parallelism of lines or planes, a perpendicularity tool configured to measure perpendicularity between two lines or planes, etc.

For example, when a user wishes to measure an angle between two planes of a workpiece, the user first selects an angularity tool from the tool bar, which in turn prompts the user to select two workpiece features (e.g., planes or lines) of the workpiece whose assuming angle is to be measured. Similarly, when a user wishes to measure parallelism, the user must first select a parallelism tool from the tool bar, which in turn prompts the user to select two workpiece features (e.g., planes or lines) of the workpiece, whose parallelism is to be measured.

Oftentimes users, in particular relatively unskilled users, may not have a clear vision of workpiece inspection or a solid grasp of programming needed to be able to select the right tool from amongst multiple tools presented in the tool bar. In the example of measuring an angle between two planes of a workpiece, the user must first make a conscious decision to select the angularity tool, then the two planes, which in turn limits the measurement operation to be performed relative to the selected two planes to only the angularity measurement. Relatively unskilled users in particular, however, are often unaware of what measurement operations are possible between multiple workpiece features or, more broadly, what information may be obtainable to characterize a relationship between multiple workpiece features. Those users may be unable to realize to measure an angle between two planes, hence unable to select the angularity tool from the tool bar. Conversely, those users may incorrectly select the angularity tool when, for the purpose of effective workpiece inspection, relational characteristics other than the angle between the two planes should be defined or measured.

Various embodiments of the present invention provide a system and method including a novel user interface configured to display a context sensitive relational command menu. The context sensitive relational command menu indicates a valid set of relational commands determined based on a concurrently selected geometric feature set including at least two geometric features concurrently selected and indicated in the user interface. The relational commands include one or more relational feature commands operable to define a corresponding constructed feature based on the concurrently selected geometric feature set, wherein the constructed feature is to be included in a workpiece feature inspection plan. The relational commands additionally or alternatively include one or more relational measurement commands operable to define a corresponding relational measurement operation based on the concurrently selected geometric feature set, wherein the relational measurement operation is to be included in the workpiece feature inspection plan.

For example, when a user concurrently selects two workpiece planes to be inspected, the two workpiece planes are in the selected geometric feature set and are so indicated in the user interface, for example, highlighted or shown in a different color than the rest of the workpiece in the user interface. The context sensitive relational command menu is displayed, which indicates a valid set of relational commands determined based on the concurrently selected two workpiece planes. The valid set of relational commands may include, for example, an "intersection line" command operable to define an intersection line, which is a constructed feature based on the concurrently selected two workpiece planes, or an "angle" command operable to define a relational measurement operation to measure an angle between the concurrently selected two workpiece planes. The "intersection line" defined by the relational feature command and the "angle" measurement operation defined by the relational measurement command are, if selected, included in the current workpiece feature inspection plan. A user, in particular a relatively unskilled user, may thus readily understand that, with respect to the concurrently selected two workpiece planes, an intersection line may be defined and an angle may be measured, and may make an appropriate selection of the desired relational command from the menu.

In one aspect, a system is provided for programming workpiece feature inspection operations for a coordinate measuring machine (CMM). The CMM includes at least one sensor used for determining workpiece feature measurement data, a stage for holding a workpiece wherein at least one of the sensor or the stage are movable relative to one another, and a CMM control portion. The system includes generally four components: a computer aided design (CAD) file processing portion, a geometric relationship analyzer, an inspection motion path generation portion, and a user interface.

The CAD file processing portion inputs or generates a workpiece CAD file corresponding to a workpiece, and analyzes the file to automatically determine inspectable workpiece features on the workpiece corresponding to a plurality of geometric feature types, such as lines, planes, circles, cylinders, spheres, cones, etc.

The geometric relationship analyzer performs geometric analysis operations, including geometric analysis operations usable to analyze relational features that are based on a geometric feature set comprising at least two geometric features. There are two types of geometric features: one is a workpiece feature and the other is a constructed feature that is determined based on at least two workpiece features. For example, workpieces features may be lines, planes, circles, cylinders, spheres, cones, etc. of a workpiece to be inspected, and constructed features may be a point of intersection, a line of intersection, a circle of intersection (e.g., between a plane and a cylinder), an overlapping plane, an overlapping volume, a concentric axis, etc. determined based on at least two workpiece features.

The inspection motion path generation portion automatically generates at least part of an inspection motion path used in an inspection program generated by the system based on a current workpiece feature inspection plan for inspecting the workpiece represented by the workpiece CAD file.

The user interface includes an editable plan representation of the current workpiece inspection plan for the workpiece corresponding to the CAD file, wherein the editable plan representation includes at least one of geometric features (workpiece features and/or constructed features) and inspection operation representations (e.g., an "angle" measurement operation representation, a "distance" measurement operation representation, etc.). The user interface also includes a workpiece inspection program simulation portion configured to display a 3D view including at least one of geometric features and inspection operation representations corresponding to inspection operations to be performed on geometric features according to the current workpiece feature inspection plan. The user interface further includes a context sensitive menu portion configured to display a context sensitive relational command menu that indicates a valid set of relational commands. The valid set of relational commands includes relational feature or relational measurement commands, operable to define a corresponding constructed feature or corresponding relational measurement operation to be included in the current workpiece feature inspection plan. The valid set of relational commands is determined based on a concurrently selected geometric feature set including at least two geometric features concurrently selected and indicated in the user interface.

In one aspect, a context sensitive relational command menu is configured to indicate the valid set of relational commands by at least one of: a) limiting the relational commands displayed in the context sensitive relational command menu to the valid set, b) presenting valid and invalid relational commands in different respective formats in the relational command menu, or c) making invalid relational commands inoperable in the relational command menu.

In another aspect, in at least one operating configuration, a complete list of relational commands operable for at least two geometric features, such as the prior art tool bar including all video tools supported by the system, is not displayed. The context sensitive relational command menu includes a first subset and excludes a second subset of the relational commands in the complete list. The first subset includes the one or more valid relational commands, and the second subset excluded from the menu includes one or more invalid relational commands for the concurrently selected geometric feature set.

In another aspect, the valid set of relational commands indicated in the context sensitive relational command menu differs depending on an analysis of the relational features that are based on the concurrently selected geometric feature set, or depending on a geometric relationship or spatial orientation between the at least two geometric features included in the concurrently selected geometric feature set.

In yet another aspect, in response to selection of a valid relational command from the context sensitive relational command menu, the 3D view is automatically updated to display an indication of the corresponding constructed feature or corresponding relational measurement operation to be included in the current workpiece feature inspection plan. Additionally, in response to selection of the valid relational command from the context sensitive relational command menu, the editable plan representation of the workpiece feature inspection plan is automatically updated correspondingly.

According to a further aspect, a method is provided for programming workpiece feature inspection operations for a coordinate measuring machine (CMM). The method includes generally two steps.

First, a CMM user interface is presented to display a 3D view including at least one of geometric features of a workpiece to be inspected and inspection operation representations corresponding to inspection operations to be performed on the geometric features according to a current workpiece feature inspection plan. Each geometric feature is one of a workpiece feature or a constructed feature that is determined based on at least two workpiece features.

Second, a context sensitive relational command menu is displayed, which indicates a valid set of relational commands comprising relational feature or relational measurement commands, operable to define a corresponding constructed feature or corresponding relational measurement operation to be included in the current workpiece feature inspection plan. The valid set of relational commands is determined based on a concurrently selected geometric feature set including first and second geometric features concurrently selected and indicated in the CMM user interface.

It will be appreciated that in prior systems and methods, a user was/is required to first select a measurement/definition tool from a display of all such tools available in the system, such as an angle measurement tool or a distance measurement tool, and thereafter select the workpiece features to which they had hoped to be apply their selected measurement/definition tool. Only after all these steps would a user learn whether the selected tool and the selected workpiece features were in fact compatible. On the other hand, in accordance with various embodiments of the present invention, a user first selects two or more geometric features, and a context sensitive relational command menu is displayed indicating a valid set of relational commands that are automatically selected or determined to be compatible (that is, valid operationally) with the concurrently selected two or more geometric features. Thus, users, in particular relatively unskilled users, may readily understand what types of relational features may be determined from the concurrently selected two or more geometric features and what types of measurement operations may be performed between the concurrently selected two or more selected geometric features, and immediately make an appropriate selection of the desired relational feature/measurement command from the menu without uncertainty or error.

BRIEF DESCRIPTION OF THE DRAWINGS

FIG. 1 is a diagram showing various typical components of a metrology system comprising a CMM.

DETAILED DESCRIPTION

Figure 2A:
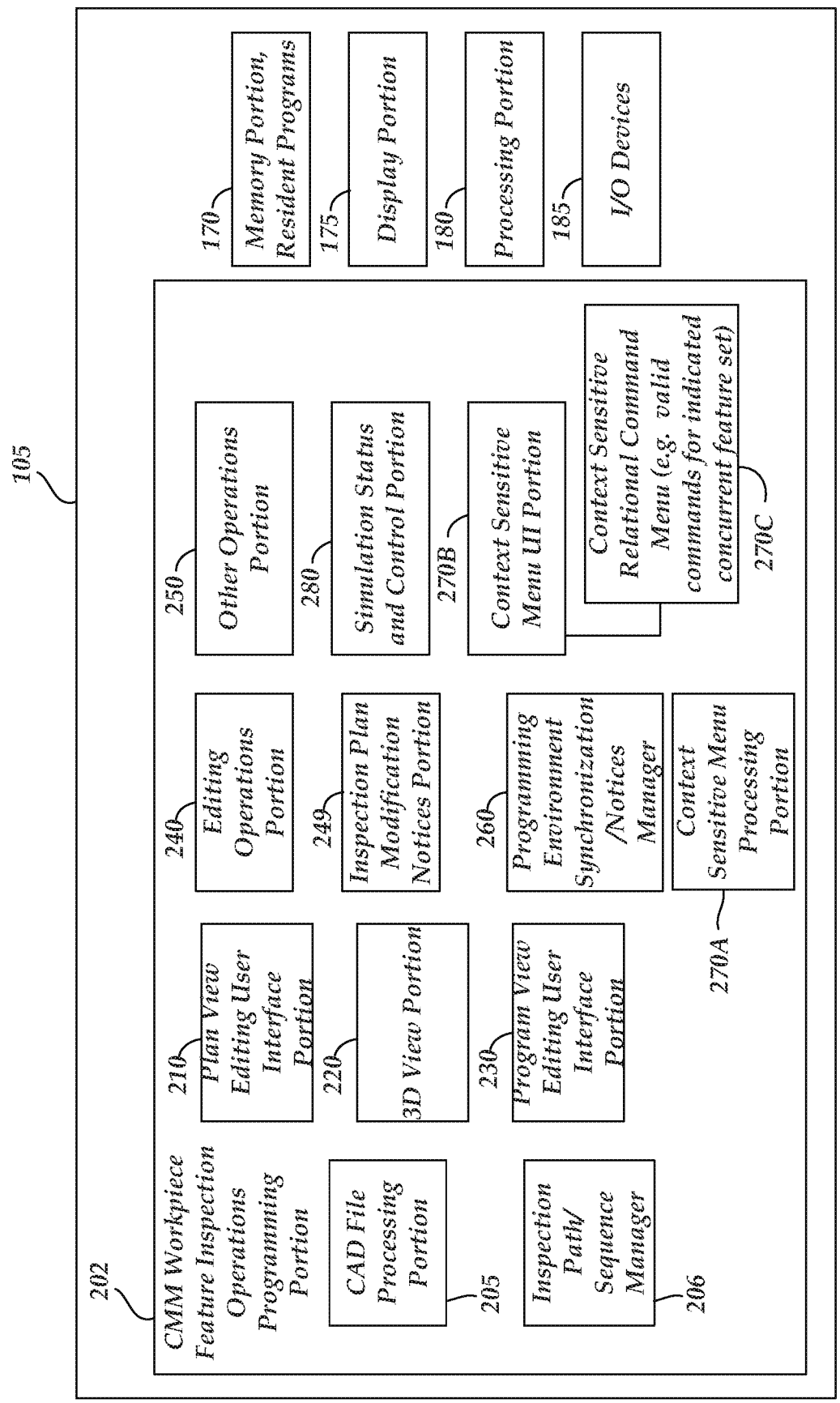
FIGS. 2A and 2B are diagrams showing various elements of one embodiment of a computing system on which workpiece feature inspection operations may be programmed for the CMM of FIG. 1.

FIG. 1 is a diagram showing various typical components of a metrology system 1 including a generic CMM, which provides one context for application of the principles disclosed herein. Certain aspects of the metrology system 1 are further described in the '746 patent. The metrology system 1 may include: a CMM body 2; a motion controller 3 that controls a drive of the coordinate measuring machine body 2; an operating unit 4 for manually operating the coordinate measuring machine body 2; and a host computer 5 that issues commands to the motion controller 3 and executes processing such as for the inspection of features on a workpiece 10 (an object to be measured) disposed on the CMM body 2. A representative input unit 61 and output unit 62 are connected to the host computer 5, as well as to a display unit 5D. The display unit 5D may display a user interface, for example as described further below with respect to FIGS. 3-12.

The CMM body 2 may include: a probe 21 having a stylus 21T which may contact a surface of the workpiece 10; a movement mechanism 22 that includes a three-axis slide mechanism 24 that holds the base end of the probe 21; a measurement stage 23 that holds the workpiece 10 and on which a drive mechanism 25 moves the slide mechanism 24. In various implementations, the drive mechanism 25 may be controlled by a CMM control portion (e.g., including the motion controller 3). In various implementations one or more sensors of the CMM (e.g., including the probe 21 and/or stylus 21T) may be moved relative to the measurement stage 23 (e.g., as controlled by the motion controller 3) and utilized for determining workpiece feature measurement data (e.g., with regard to physical dimensions of features of the workpiece 10).

Figure 2B:
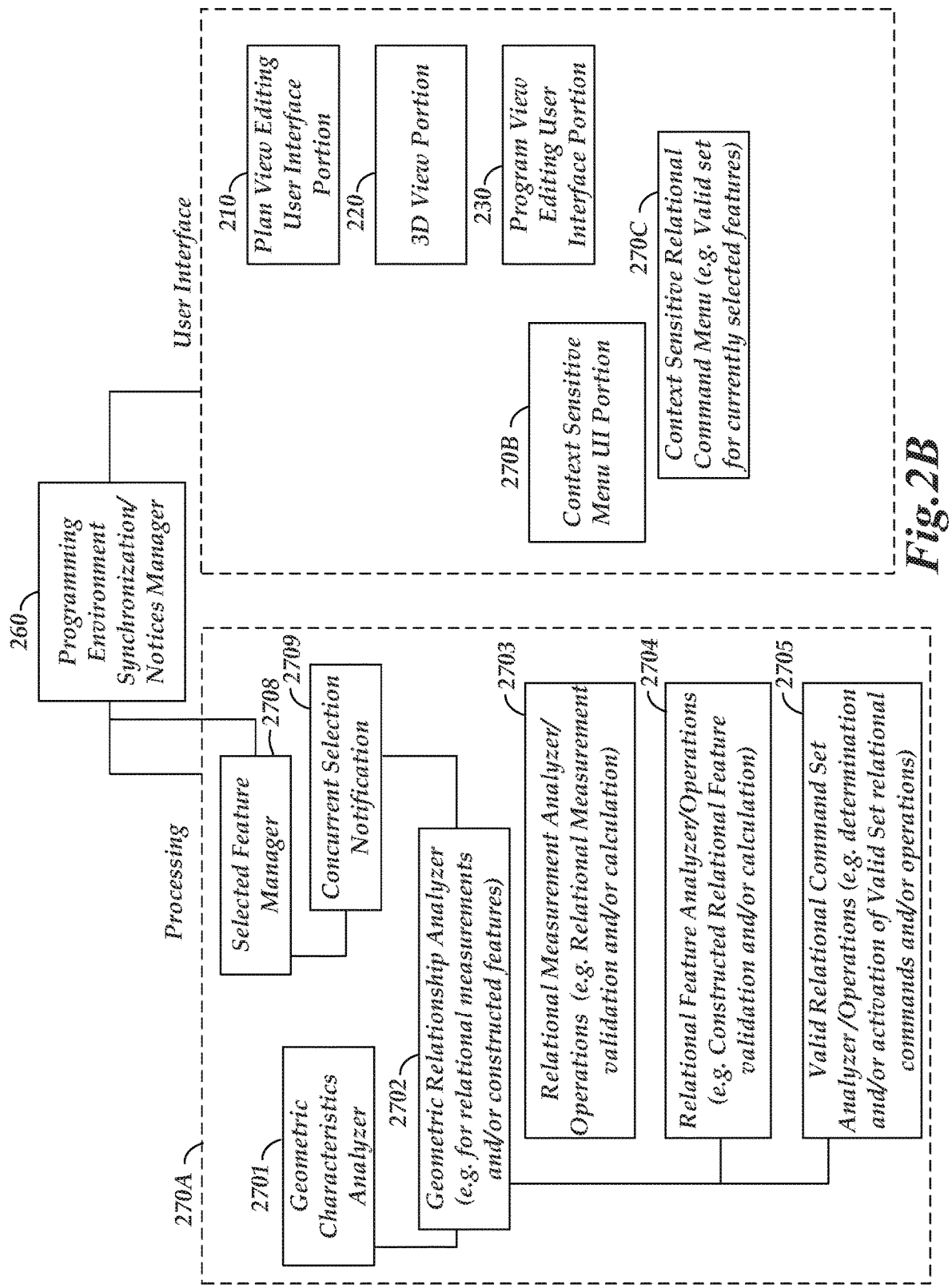

FIGS. 2A and 2B are diagrams of a computing system 105 including one embodiment of a programming portion 202 on which workpiece feature inspection operations may be programmed for a CMM (e.g., the CMM body 2 of FIG. 1). In various implementations, the computing system 105 and/or other associated computer system(s) may include suitable unitary or distributed computing systems or devices, which may include one or more processors (hardware) that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in a memory portion, such as random access memory (RAM), read-only memory (ROM), flash memory, or the like, or a combination of such components. Software may also be stored in one or more storage devices, such as disk drives, solid-state memories, or any other medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and in various implementations may be accessed via service calls.

As shown in FIG. 2A, in various implementations the computing system 105 (e.g., the computer 5 of FIG. 1 or a separate computer) may include a memory portion 170, a display portion 175, a processing portion 180, an input-output devices portion 185 and the programming portion 202. The memory portion 170 includes resident programs and other data utilized by the computing system 105. The display portion 175 provides the display for the computing system 105 (e.g., similar to the display unit 5D of FIG. 1), including the display features provided by the programming portion 202. The processing portion 180 provides for the signal processing and control of the computing system 105, while the input-output devices portion 185 receives and provides control signals and outputs to and from various devices (e.g., the CMM controller 3 of FIG. 1).

As shown in FIG. 2A, in one embodiment, the programming portion 202 includes a CAD file processing portion 205, an inspection path and/or sequence manager 206, a plan view editing user interface portion 210, a 3D view portion 220, a program view editing user interface portion 230, an editing operations portion 240, which may include an inspection plan modification notices portion 249, an "other" operations portion 250 including other (non-editing related) operations relevant to the use and functioning of the programming portion 202 and/or computing system 105, a programming environment synchronization and/or notices manager 260, a context sensitive menu processing portion 270A and a context sensitive menu user interface (UI) portion 270B which are configured to cooperatively generate a context sensitive relational command menu 270C, and a simulation status and control portion 280.

In various implementations, the computer-aided design (CAD) file processing portion 205 inputs or generates a workpiece CAD file corresponding to a workpiece (e.g., the workpiece 10 of FIG. 1) and analyzes the file to automatically determine inspectable workpiece features on the workpiece corresponding to a plurality of geometric feature types (e.g., cylinder, plane, sphere, cone, etc.). The inspection path/sequence manager 206 may automatically determine a motion control path that allows the CMM to obtain measurements that characterize the workpiece features. Methods usable for implementing the CAD file processing portion 205 and/or the inspection path/sequence manager 206 are known in the art, as exemplified in various commercial CAD products, and/or in CAD "extension programs" for creating inspection programs and/or other known CMM inspection programming systems and/or systems which automatically generate machine tool programs from CAD data. For example, U.S. Pat. Nos. 5,465,221; 4,901,253; 7,146,291; 7,783,445; 8,302,031; 5,471,406 and 7,058,472, each of which is hereby incorporated herein in their entirety, disclose various methods which may be used to analyze CAD data and determine geometric features of a workpiece and then automatically generate a motion control path for placing a probe or sensor at inspection points that measure or characterize the geometric features. In some embodiments, determining the geometric features may simply comprise extracting or recognizing the categorized geometric features inherently defined in some modern CAD systems. In some embodiments, product and manufacturing information (PMI, for short) is present in the CAD data, and may be used in the aforementioned processes. PMI conveys non-geometric attributes in CAD data, and may include geometric dimensions and tolerances, surface finish, and the like. In some embodiments, in the absence of PMI, default tolerances and other default inspection rules may be used in automatic operations of the CAD file processing portion 205 and the inspection path/sequence manager 206.

The motion control path may generally define a feature inspection sequence as well as individual inspection points (e.g., touch probe measurement points, or non-contact measurement points, or point cloud determination regions, etc.), as well as the motion path between such points. In some embodiments, the CAD file processing portion 205 may include the inspection path/sequence manager 206, or they may be merged and/or indistinguishable. In one embodiment, one or both of the aforementioned automatic processes may be automatically triggered when a target CAD file is identified in the programming portion 202. In other embodiments, one or both of the aforementioned automatic processes may be triggered in relation to a target CAD file based on operator input that initiates the processes. In other less desirable embodiments, similar processes may be semi-automatic and require user input in the programming portion 202 for certain operations or decisions.

In any case, in various embodiments the aforementioned processes may, in effect, be used to provide a comprehensive inspection plan and/or inspection program for a workpiece. In some contexts, the connotations of the term "inspection plan" may encompass primarily what features are to be inspected and what measurements are to be made on each, and in what sequence, and the connotations of the term "inspection program" may primarily encompass how the inspection plan is to be accomplished on a particular CMM configuration (e.g., following the "instructions" inherent in the inspection plan, but also including the motion speeds and path, the probe or sensor to be used, and so on for a defined CMM configuration.) Other portions of the programming portion 202 may use the results of the CAD file processing portion 205 and the inspection path/sequence manager 206 to perform their operations and populate and/or control their associated user interface portions, and the like. The plan view editing user interface portion 210 includes an editable plan representation of a workpiece feature inspection plan for the workpiece corresponding to the CAD file. In various implementations, the program view editing user interface portion 230 may also (or instead) include an editable plan representation.

Figure 3:
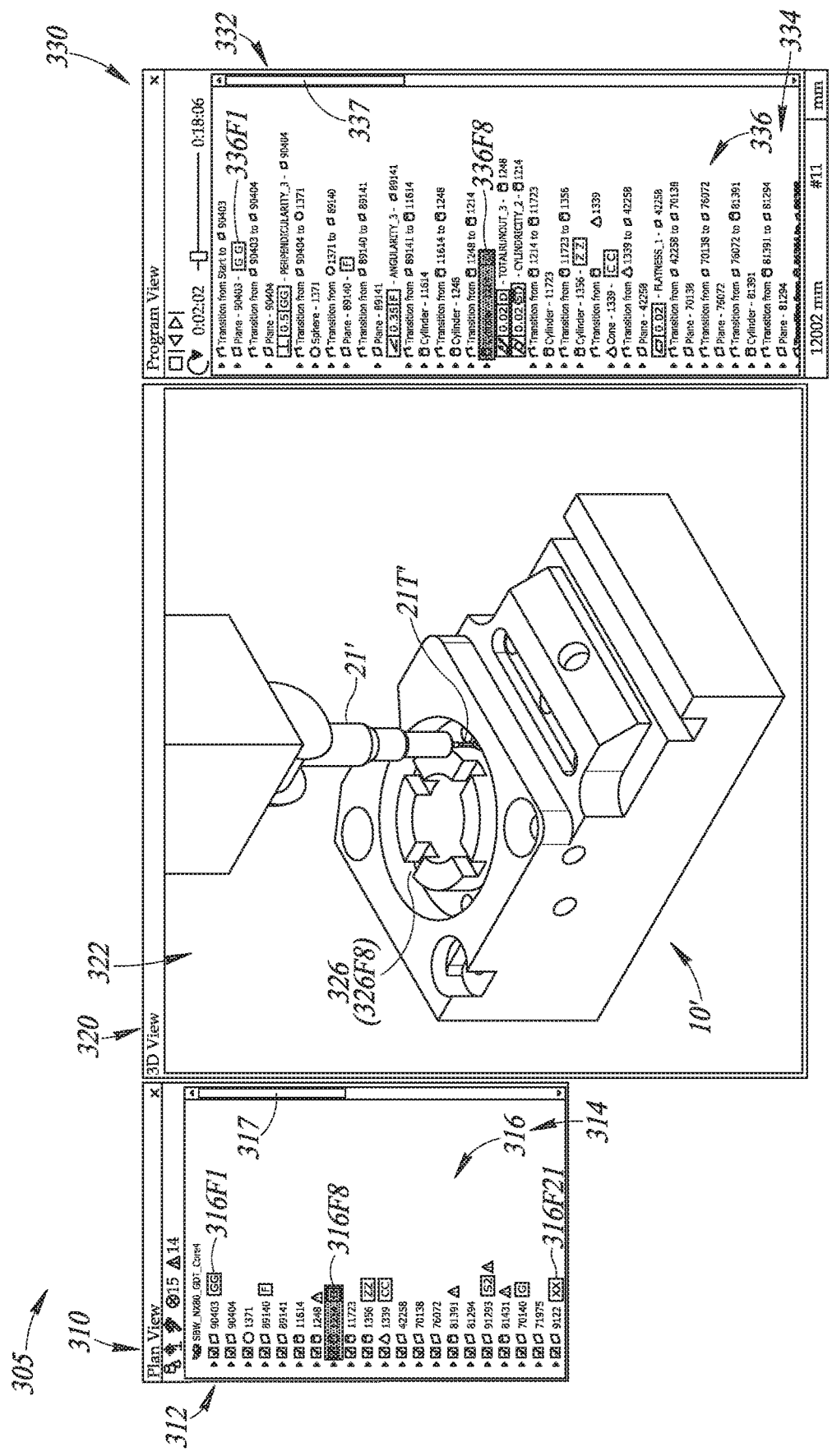
FIG. 3 is a diagram of a user interface including three view portions—an editable plan representation view ("Plan View"), a workpiece inspection program simulation portion view ("3D View"), and an (editable) program view ("Program View")—which are automatically globally responsive to editing operations performed in any of the three view portions, which respectively indicate inspection operations of a workpiece according to a current workpiece feature inspection plan.

In the CMM programming systems disclosed in co-assigned U.S. patent applications Ser. Nos. 14/682,976, 14/702,538, and 14/703,814 incorporate herein above, visualization of the effect of editing changes to the inspection plan and/or inspection program is immediately or continuously available in real time in the user interface (e.g., through a displayed 3D simulation). For example, FIG. 3 is a diagram of a user interface 305 (e.g., as may be shown on the display unit 5D of FIG. 1, the display portion 175 of FIG. 2A, etc.), including three view portions: an editable plan representation ("Plan View") 310 supported by the plan view editing user interface portion 210, a "3D View" 320 supported by the 3D view portion 220 (alternatively called a workpiece inspection program simulation portion 220), and a "Program View" 330 supported by the program user interface portion 230. Editing operations performed in any of the three view portions are immediately incorporated (e.g., automatically or with very minimal effort by the user) into the current version of the inspection plan and/or inspection program, which is then reflected in the various portions of the programming portion 202 and its user interface(s). As a result, these three view portions are automatically globally responsive to editing operations performed in any of the three view portions, which respectively indicate inspection operations of a workpiece 10' according to the current workpiece feature inspection plan. In the illustrated embodiment, this may be accomplished through the operations of the programming environment synchronization/notices manager 260, which in one embodiment may be implemented using known "publisher-subscriber" methods, which are sometimes implemented using XML-like languages (e.g., as used for notifications between web pages). In various embodiments, a publisher-subscriber method may be implemented by adapting methods such as a list-based method, or a broadcast-based method, or a content-based method to support the features disclosed herein. In a CMM programming environment, the publishers and subscribers are generally located in the same processing space, and it is possible for the identity of the "subscriber" windows to be known by the "publisher" (e.g., as may be recorded or implemented using the programming environment synchronization/notices manager 260, for example.)

In one embodiment, determining and/or generating various workpiece features and measurement operations in the CAD file processing portion 205 and the inspection path/sequence manager 206 may include generating and/or sharing a unique identifier for each workpiece feature and measurement operation. When the results from those portions are used in other portions of the programming portion 202, the various identifiers may also be used or cross-referenced in the other portions to establish relevant associations between corresponding workpiece features and/or inspection operations across the various processing and/or user interface portions.

The user interface of the programming portion 202 includes a set of editing operations (which also include the underlying programming instructions and/or routines), usable to edit the workpiece feature inspection plan and/or inspection program. For example, the user interface operations may include selections of text or graphical elements that represent workpiece features or inspection operations, followed by activation of relevant commands or other user interface operations that affect the selected elements. In one embodiment, the editing operations portion 240 may provide or identify such editing operations. In one embodiment, the inspection plan modification notices portion 249 may be responsive to operations included in the editing operations portion 240 to provide a notice to the programming environment synchronization/notices manager 260 that an inspection plan modification is taking place.

In response, the programming environment synchronization/notices manager 260 may then (e.g., automatically) manage the exchange of various event or programming operation notifications and related unique identifiers, such that the CAD file processing portion 205 and/or the inspection path/sequence manager 206 appropriately edit or modify the current inspection plan and inspection program in a synchronized manner when one of the set of editing operations is performed. Such plan and program modifications may be performed very quickly in various embodiments, because the unique identifiers described above may be used to efficiently focus the modifications on only those features and/or measurement operations affected by the currently active one of the set of editing operations. After that, the programming environment synchronization/notices manager 260 may notify other portions of the programming portion 202 (e.g., any of the plan view editing user interface portion 210, 3D view portion 220, and program view editing user interface portion 230), so that they are immediately updated using information from the edited plan and/or program. The unique identifier(s) of the most recently edited elements may again be used to speed up such operations, in that the updating need only focus on those elements associated with the identifiers.

It should be appreciated that the programming environment synchronization/notices manager 260 may also manage inter-portion communications and exchanges besides those associated with the editing operations. In various embodiments, it may facilitate the synchronization between the various user interface windows or portions of the programming portion 202. For example, selection of a particular feature or instruction in one window may automatically trigger a notification or instruction to other windows to display a corresponding feature or instruction in that other window, or depict a program operating state associated with the selected feature or instruction, or the like.

As illustrated in detail in FIG. 2B, the programming environment synchronization/notices manager 260 may manage inter-portion communications and exchanges between the context sensitive menu processing portion 270A and the context sensitive menu UI portion 270B, to achieve generation and display of a context sensitive relational command menu 270C. The context sensitive relational command menu 270C indicates a valid set of relational commands based on a concurrently selected geometric feature set including at least two geometric features concurrently selected and indicated in the user interface.

The context sensitive menu processing portion 270A includes a geometric characteristics analyzer 2701 which may include a geometric relationship analyzer 2702, which in turn may include a relational measurement analyzer/operations 2703, relational feature analyzer/operations 2704, and valid relational feature command set analyzer/operations 2705. The context sensitive menu processing portion 270A also includes a selected feature manager 2708 which may include a concurrent selection notification 2709.

The selected feature manager 2708 is responsible for processing user selection of geometric features of a workpiece, and the concurrent selection notification 2709 is responsible for defining and notifying to other portions of the computing system 105 a concurrently selected geometric feature set comprising at least two geometric features concurrently selected and indicated in the user interface.

The geometric characteristic analyzer 2701 performs geometric analysis operations on geometric features, in particular those selected geometric features under the control of the selected feature manager 2708. The geometric analysis operations analyze geometric characteristics, such as shape, size, dimensions, orientation, etc. of geometric features usable for the purpose of programming workpiece feature inspection operations. The geometric relationship analyzer 2702 in various implementations determines a valid set of relational commands corresponding to a set of valid geometric relationships that can be determined between the geometric features. Specifically, the geometric relationship analyzer 2702 is operable to perform geometric analysis operations usable to analyze "relational features" that are based on a geometric feature set defined by the concurrent selection notification 2702. In other words, with respect to at least two geometric features concurrently selected and indicated in the user interface (e.g., in the plan view window 310, the 3D view window 320, and/or in the program view window 330), the geometric relationship analyzer 2702 analyzes and defines "relational features."

The relational features include relational measurement operations that may be performed on or between the concurrently selected geometric features, such as an angle measurement operation (e.g., between two planes, between two lines), and a distance measurement operation (e.g., between two parallel planes, between two parallel volumes). The geometric relationship analyzer 2702 may include relational measurement analyzer/operations 2703 responsible for analyzing and defining the relational measurement operations which can be performed on the concurrently selected geometric features. In some embodiments, the relational measurement analyzer/operations 2703 validate and/or calculate what relational measurement operations are valid for the concurrently selected geometric features. For example, when two concurrently selected planes meet each other, an angle measurement operation is valid but a distance measurement operation may not be valid for these planes. Likewise, when two concurrently selected planes are parallel to each other, a distance measurement operation is valid but an angle measurement operation is invalid for these planes.

The relational features defined by the geometric relationship analyzer 2702 may also include new features to be constructed based on the concurrently selected geometric features. Such new features may include a point of intersection (e.g., between a line and a plane), a line of intersection (e.g., between two planes), a circle of intersection (e.g., between a cylinder and a plane), an overlapping plane (e.g., between two planes), an overlapping volume (e.g., between two volumes), a concentric axis (e.g., between two circles), etc. Those features that can be constructed based on the concurrently selected geometric features are herein called "constructed features." The geometric relationship analyzer 2702 may include relational feature analyzer/operations 2704 responsible for analyzing and defining the constructed features which can be determined or generated based on the concurrently selected geometric features. In some embodiments, the relational feature analyzer/operations 2704 validate and/or calculate what constructed features are valid for the concurrently selected geometric features. For example, when two concurrently selected planes meet each other, an intersection line is a valid constructed feature, but an intersection circle cannot be constructed and thus is an invalid constructed feature.

Note that constructed features based on concurrently selected workpiece features on a workpiece may in turn be used to construct further constructed features. For example, an intersection line constructed based on two concurrently selected planes that meet each other is a constructed feature, and the constructed "intersection line" feature may then be concurrently selected with another line (which may be an original workpiece feature line or may be a constructed feature line), to define yet another constructed "intersection point" feature. As used herein, the term "geometric feature" broadly encompasses workpiece features that are originally defined (e.g., found by the CAD file processing portion 205) on a workpiece, constructed features built from workpiece features, and further constructed features built from constructed features and/or a combination of constructed features and workpiece features.

Still referring to FIG. 2B, the geometric relationship analyzer 2702 may further include a valid relational command set analyzer/operations 2705, which is responsible for determining or activating a valid set of relational commands. The valid set of relational commands include one or more relational measurement commands operable to define corresponding relational measurement operations to be included in a current workpiece feature inspection plan, and/or one or more relational feature commands operable to define corresponding constructed features to be included in the current workpiece feature inspection plan. The valid set of relational measurement commands and relational feature commands for the concurrently selected geometric features is found based on the processing results of the relational measurement analyzer/operations 2703 and the relational feature analyzer/operations 2704.

Figure 6:
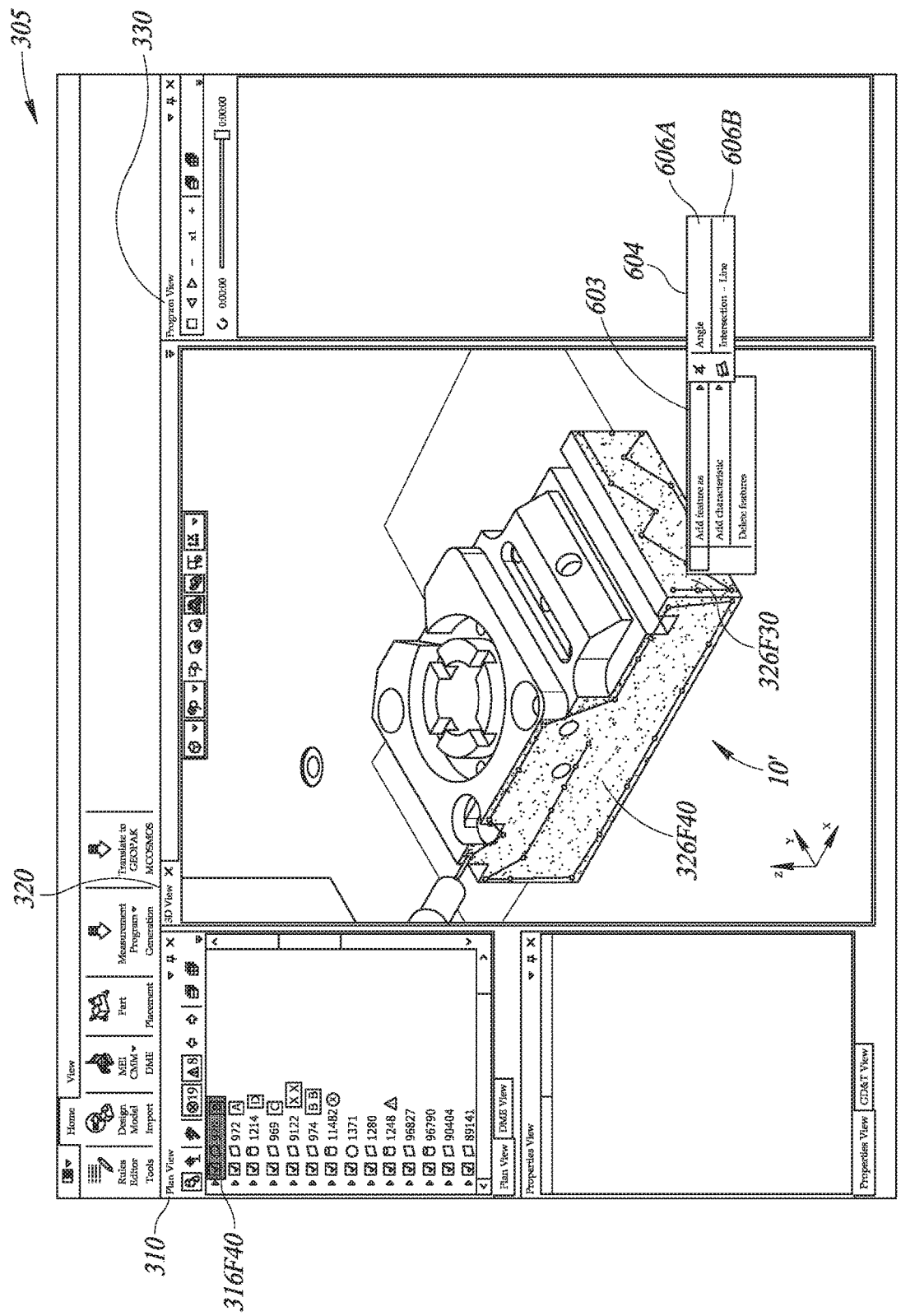
FIG. 6 is a diagram of the user interface including a context sensitive relational command menu that indicates a valid set of relational commands—an "angle" measurement operation command and an "intersection line" feature construction command—, which are determined based on the first and second geometric features concurrently selected and indicated in the user interface as in FIG. 5.

The programming environment synchronization/notice manager 260 facilitates the synchronization of the valid set of relational commands, determined by the valid relational command set analyzer/operations 2705, with the user interface of the computing system 105. In various implementations the user interface includes the context sensitive menu UI portion 270B, the plan view editing interface portion 210, the 3D view portion 220, and the program view editing user interface portion 230. The context sensitive menu UI portion 270B is configured to display a context sensitive relational command menu (e.g., 604 in FIG. 6) that indicates the valid set of relational commands, defined by the valid relational command set analyzer/operations 2705. The valid set of relational commands include relational feature or relational measurement commands operable to define a corresponding constructed feature or corresponding relational measurement operation to be included in the current workpiece feature inspection plan. The context sensitive relational command menu 604 may be displayed anywhere on the display portion 175 of FIG. 2A (or 5D of FIG. 1) of the computing system 105, including the plan view window 310, the 3D view window 320, and the program view window 330. In some embodiments, as shown in FIG. 6, the context sensitive relational command menu 604 is displayed adjacent to the geometric features that are concurrently selected and indicated in the user interface, for example in the 3D view window 330, in order to provide valuable feedback to a user performing inspection plan programming operations. Specifically, a user, in particular a relatively unskilled user, by concurrently selecting two or more geometric features on the user interface of the computing system 105, is presented with a context sensitive relational command menu 604 adjacent to the concurrently selected geometric features. The menu indicates a valid set of relational commands, from which the user can readily select one command to have its corresponding relational measurement operation or corresponding constructed feature included into the current workpiece feature inspection plan.

FIG. 3 is a diagram of a user interface 305 (e.g., as may be shown on the display unit 5D of FIG. 1, the display portion 175 of FIG. 2A, etc.). It will be appreciated that certain numbered elements 3XX of the user interface 305 may correspond to and/or be provided by similarly numbered elements 2XX of FIGS. 2A and 2B. In the implementation shown in FIG. 3, the user interface 305 includes the plan view window ("Plan View") 310, the 3D view window ("3D View") 320, and the program view window ("Program View") 330. The plan view window 310 includes an editing user interface portion 312, the 3D view window 320 includes a workpiece inspection program simulation portion 322, and the program view window 330 includes an editing user interface portion 332. The editing user interface portions 312 and 332 each include plan representations 314 and 334, respectively, of a workpiece feature inspection plan for a workpiece 10' corresponding to a CAD file processed in the CAD file processing portion 205. The plan representation 314 in the "Plan View" is organized in terms of geometric features to be inspected on the workpiece. The plan representation 334 in "Program View" is organized as inspection program pseudo-code or actual code or graphical program operation representations or the like, in various embodiments. In the illustrated embodiment, each or both of the plan representations 314 and 334 are editable (that is, they are editable plan representations.) When editing operations are performed for one of the editable plan representations 314 and 334, the other plan representation may be automatically updated in a manner consistent with those editing operations by operation of the various system elements illustrated and described with respect to FIGS. 2A and 2B. However, in some embodiments, only one of the plan representations 314 and 334 need be editable. In such a case, the other plan representation may be absent, or hidden, or may be displayed and automatically updated.

The editable plan representations 314 and 334 include the editable set of geometric feature, collectively 316 and 336, to be inspected. In FIG. 3, the editable plan representation 314 in the "Plan View" presently displays geometric features 316F1~316F21, though the plan view window 310 is scrollable by a scroll bar 317 to show other portions of the workpiece feature inspection plan. The editable plan representation 334 in the "Program View" presently displays geometric features 336F1 and 336F8 ("Cylinder—1214" followed by a cylinder icon), among others, which respectively correspond to the geometric features 316F1 and 316F8 displayed in the "Plan View," though it too is scrollable by a scroll bar 337 to show other portions of the workpiece feature inspection plan. The 3D view window 320 displays a 3D view of the workpiece inspection program simulation portion 322 including workpiece features 326 on the workpiece 10' including the geometric feature 326F8 (cylinder) that corresponds to the geometric features 316F8 and 336F8 displayed in the "Plan View" and "Program View," respectively. The 3D view of the workpiece inspection program simulation portion 322 also includes display of the touch probe 21' and stylus 21T' applied to inspect the workpiece 10'. As will be described in detail below (and as observable in the "Program View"), the editable plan representations 314 and 334 in the "Plan View" and "Program View" as well as the 3D workpiece inspection program simulation portion 322 in the "3D View" may additionally or alternatively include inspection operation representations, for example icons or numeric/text descriptions of inspection operations such as an angle measurement operation and a distance measurement operation.

In the example of FIG. 3, the geometric feature 326F8 (cylinder) in the "3D View" is selected (e.g., by user clicking thereon), and selection of the geometric feature 326F8 is indicated by that the corresponding geometric features (cylinders) 316F8 and 336F8 are highlighted in the "Plan View" and "Program View."

Figure 4:
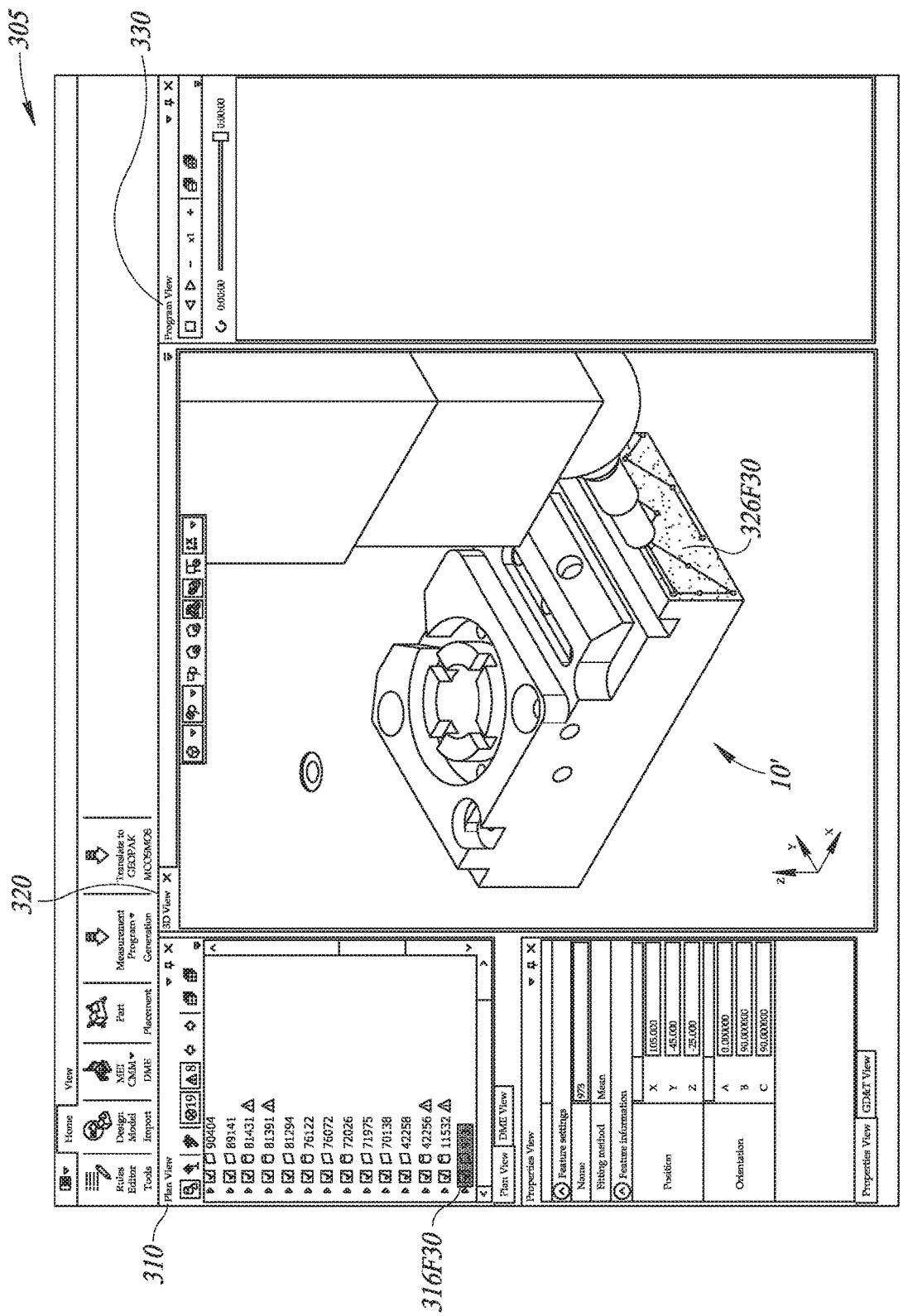
FIG. 4 is a diagram of the user interface in which one (first) geometric feature of the workpiece of FIG. 3 is selected.

FIG. 4 is a diagram of the user interface 305 of FIG. 3 in which one geometric feature 326F30, which is a plane on the workpiece 10', is selected (e.g., by clicking thereon). Selection of the geometric feature 326F30 is indicated by the geometric feature 326F30 being highlighted in the 3D view window 320, and correspondingly the geometric feature 316F30 is highlighted or otherwise marked in the editable plan representation in the plan view window 310.

Figure 5:
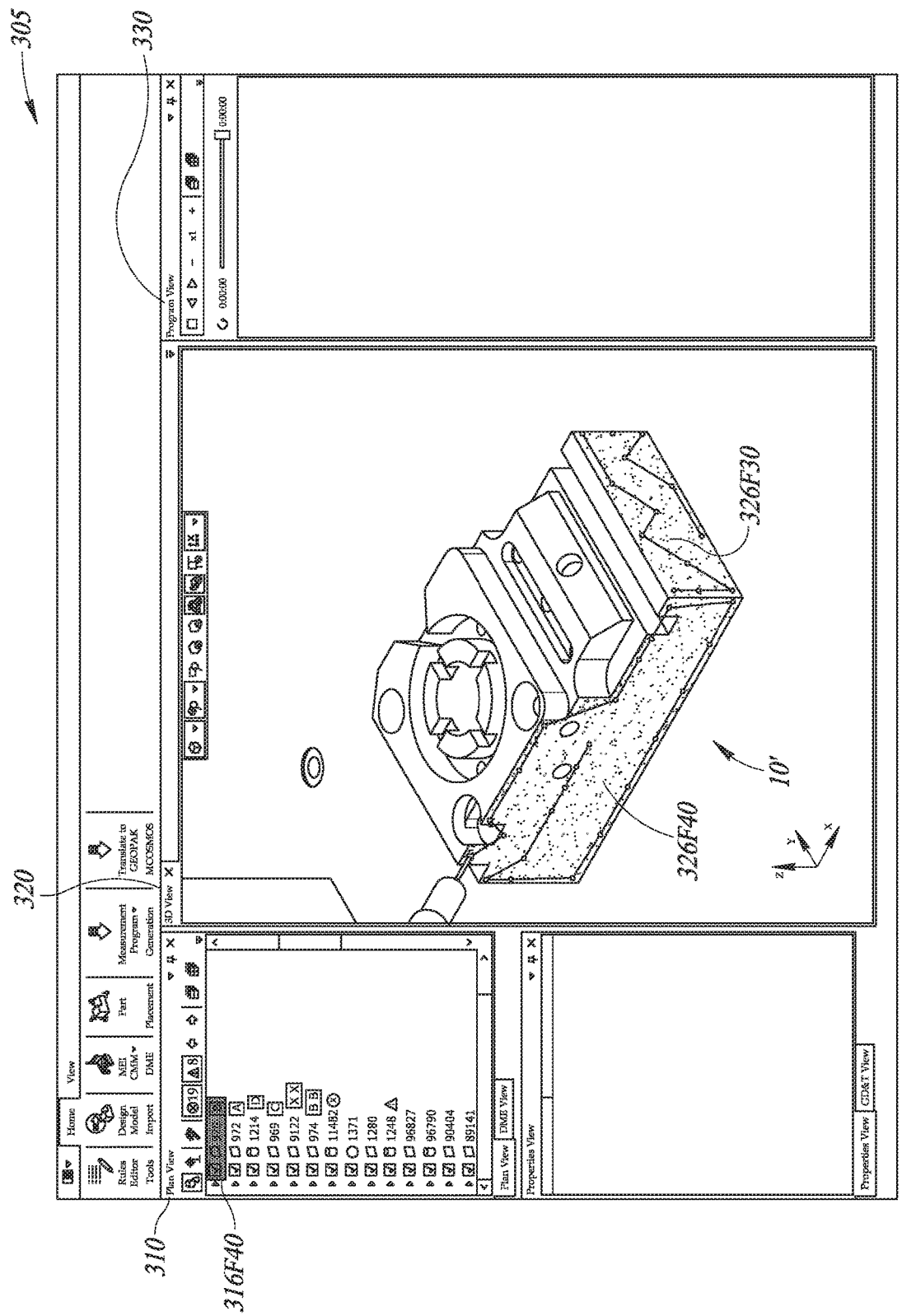
FIG. 5 is a diagram of the user interface in which another (second) geometric feature of the workpiece of FIG. 3 is concurrently selected as with the first geometric feature.

FIG. 5 is a diagram of the user interface 305 in which another (second) geometric feature 326F40, which is also a plane on the workpiece 10', is concurrently selected with the already-selected geometric feature 326F30 (e.g., by holding a "control" key with the first geometric feature 326F30 selected and clicking on the second geometric feature 326F40). The concurrent selection is indicated by both of the geometric features 326F30 and 326F40 being highlighted in the 3D view window 320. Correspondingly the geometric feature 316F40 is highlighted or otherwise marked in the editable plan representation in the plan view window 310. In the illustrated example, the concurrently selected (first) geometric feature 316F30 is not included in the portion of the editable plan representation currently visible in the plan view window 310, but if the plan view window were expanded or scrolled, it would be shown to be highlighted or otherwise marked, in various embodiments.

FIG. 6 is a diagram of the user interface 305 in which a context sensitive relational command menu 604 is displayed indicating a valid set of relational commands for the concurrently selected geometric features 326F30 and 326F40. The context sensitive relational command menu 604 includes an "angle" measurement operation command 606A operable to define an angle measurement operation, with respect to the concurrently selected geometric features, to be included in the current workpiece feature inspection plan, and an "intersection line" feature construction command 606B operable to define a constructed "intersection line" feature, based on the concurrently selected geometric features, to be included in the current workpiece feature inspection plan. In some embodiments, the context sensitive relational command menu 604 is generated and displayed automatically upon concurrent selection of at least two geometric features. In other embodiments, the context sensitive relational command menu 604 is displayed after, for example, right-clicking on the user interface 305 to display a parent menu 603, from which an "Add feature as" command is selected to display the context sensitive relational command menu 604 as a submenu. Alternatively to the submenu, a graphical toolbar might offer analogous or equivalent command buttons in some embodiments. As will be apparent to those skilled in the art a particular manner in which the context sensitive relational command menu 604 is displayed (e.g., automatically, semi-automatically, using a menu system having a defined hierarchical depth, etc.) is a matter of implementation according to each application, and the present invention disclosure is not limited to the implementation example illustrated in FIG. 6. Note that the context sensitive relational command menu 604 does not include, for example, a distance measurement operation command because the distance between the concurrently selected geometric features 326F30 and 326F40 cannot be defined and hence the distance measurement operation command is not a valid command with respect to these geometric features (e.g., as determined by the geometric relationship analyzer 2702 of FIG. 2B).

In some implementations, the context sensitive relational command menu 604 is displayed adjacent to the geometric features that are concurrently selected and indicated in the user interface 305. For example, as shown in FIG. 6, when the geometric features 326F30 and 326F40 in the 3D view window 320 are selected, the context sensitive relational command menu 604 is displayed adjacent to the geometric features 326F30 and 326F40 in the 3D view window 320. Alternatively, when the corresponding geometric features 316F30 and 316F40 in the plan view window 310 are selected (e.g., by holding a "control" key with the first geometric feature 316F30 selected and clicking on the second geometric feature 316F40 in the plan view window 310), the context sensitive relational command menu 604 may be displayed adjacent to the geometric features 316F30 and 316F40 in the plan view window 310.

Figure 7:
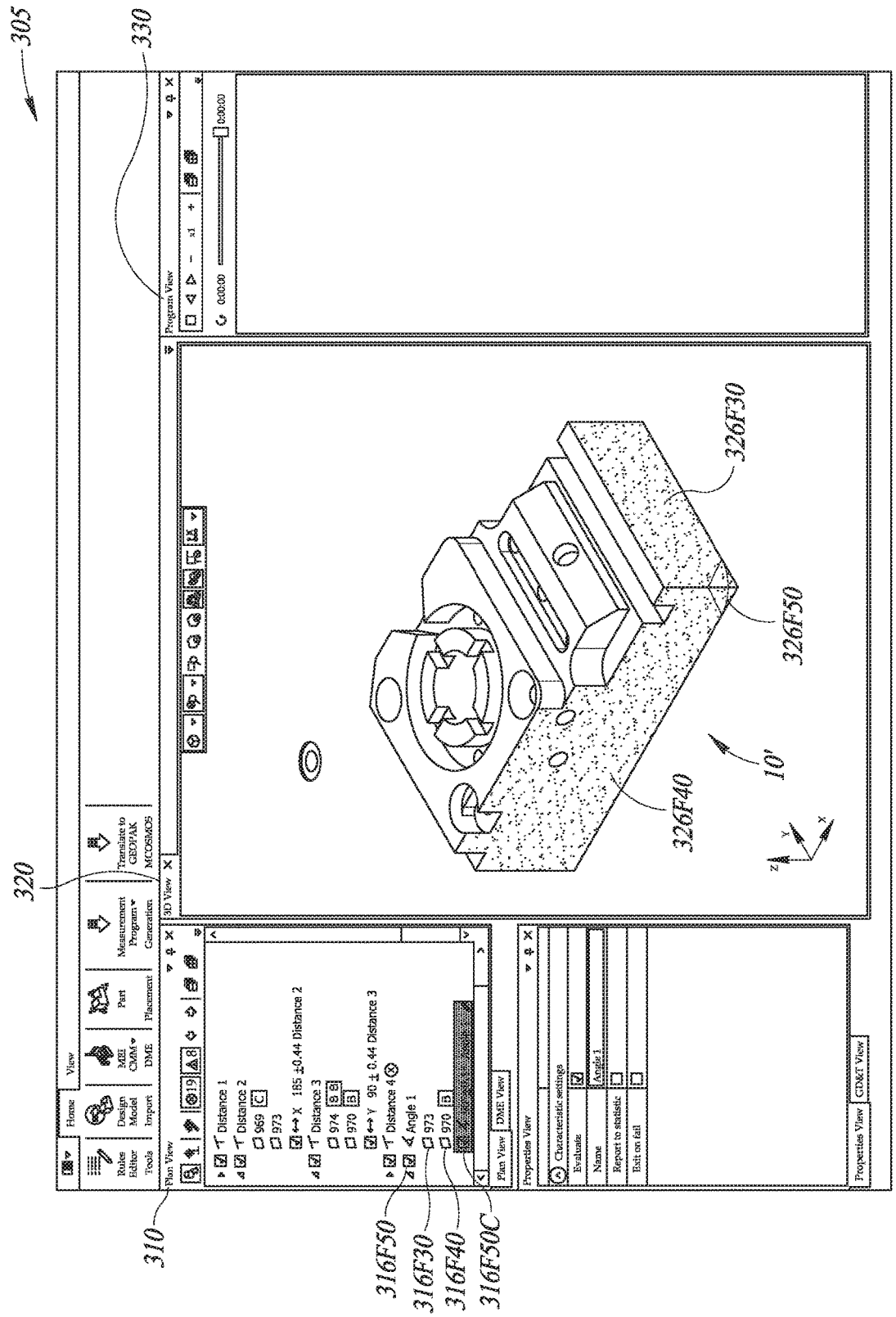
FIG. 7 is a diagram of the user interface updated in response to selection of the "angle" measurement operation command from the context sensitive relational command menu of FIG. 6, indicating that that the angle measurement operation is added to the current workpiece feature inspection plan.

FIG. 7 is a diagram of the user interface 305, which is updated in response to selection of the "angle" measurement operation command 606A from the context sensitive relational command menu 604 of FIG. 6, indicating that the angle measurement operation 326F50 is now added to the current workpiece feature inspection plan. Addition of the angle measurement operation 326F50 is graphically or otherwise indicated in the 3D view window 320. Correspondingly the angle measurement operation 316F50, operable to measure or compute an angle between the two concurrently selected geometric features 316F30 and 316F40, is added in the editable plan representation in the plan view window 310. In the illustrated example, in connection with the angle measurement operation 316F50, measurement criteria or standards for the angle measurement operation 316F50C ("90°±0.1°") are included as part of the current workpiece feature inspection plan in the plan view window 310. Processing in response to selection of the "angle" measurement operation command 606A, including incorporation of the angle measurement operation 316F50/326F50 into the current workpiece feature inspection plan and indication of the angle measurement operation 316F50/326F50 in the user interface 305, is performed, for example, by various components of the CMM workpiece feature inspection operations programming portion 202 and the associated portions and techniques described above in reference to FIG. 2A.

Figure 8:
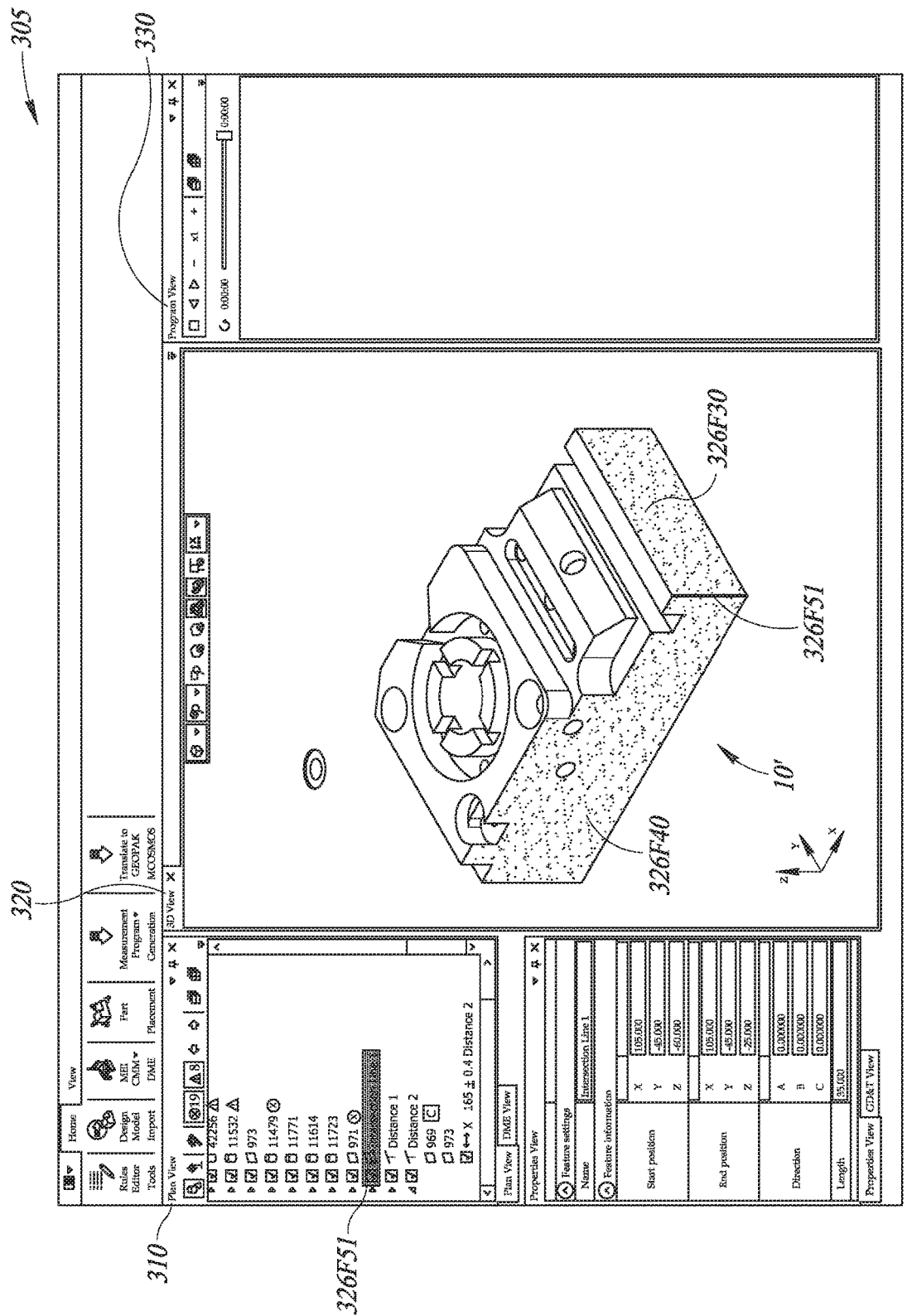
FIG. 8 is a diagram of the user interface updated in response to selection of the "intersection line" feature construction command from the context sensitive relational command menu of FIG. 6, indicating that the constructed "intersection line" feature is added to the current workpiece feature inspection plan.

FIG. 8 is a diagram of the user interface 305, which is updated in response to selection of the "intersection line" feature construction command 606B from the context sensitive relational command menu 604 of FIG. 6 (in contrast to the selection of the "angle" measurement operation command 606A, as discussed above in relation to FIG. 7), indicating that an intersection line 326F51 is now added as a newly constructed feature to the current workpiece feature inspection plan. Addition of the intersection line 326F51 is graphically or otherwise indicated in the 3D view window 320. Correspondingly the "intersection line" feature 316F51, constructed from the concurrently selected geometric features 316F30 and 316F40, is added in the editable plan representation in the plan view window 310. Processing in response to selection of the "intersection line" feature construction command 606B, including incorporation of the constructed "intersection line" feature 316F51/326F51 into the current workpiece feature inspection plan and indication of the constructed "intersection line" feature 316F51/326F51 in the user interface 305, is performed, for example, by various components of the CMM workpiece feature inspection operations programming portion 202 and the associated portions and techniques described above in reference to FIG. 2A.

Figure 9:
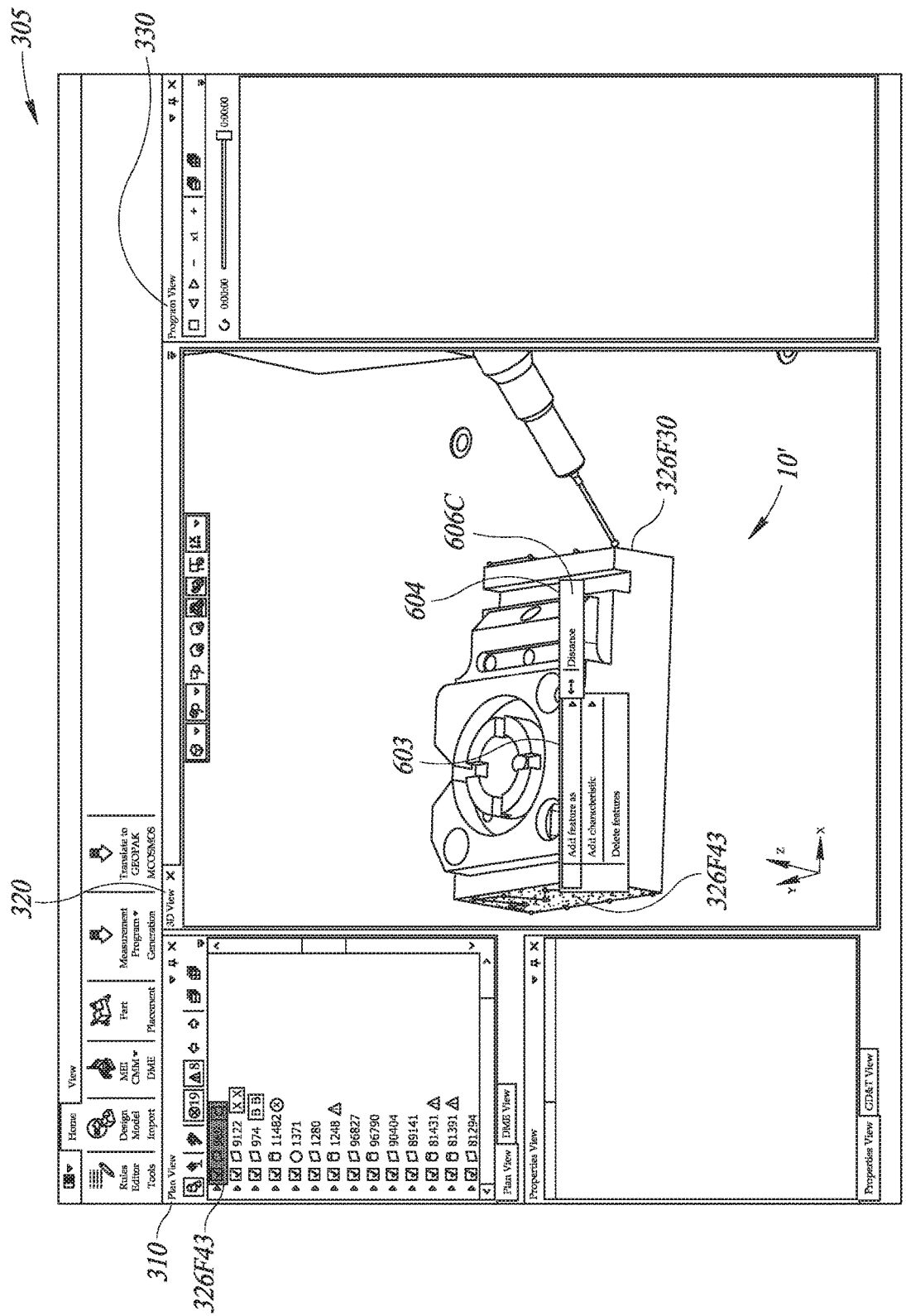
FIG. 9 is a diagram of the user interface in which two geometric features different from those in FIG. 5 are concurrently selected, and a context sensitive relational command menu different from that of FIG. 6 is displayed, which includes a "distance" measurement operation command.

FIG. 9 is a diagram of the user interface 305, in which two geometric features 326F30 and 326F43, different from the geometric features selected in FIG. 5 (326F30 and 326F40), are concurrently selected. Specifically, the geometric feature 326F43, which is a plane positioned in parallel to the geometric feature 326F30 (plane), is concurrently selected (indicated in highlight) as with the geometric feature 326F30 in the 3D view window 320. Correspondingly the geometric feature 316F43 (parallel plane) is highlighted or otherwise marked in the editable plan representation in the plan view window 310. In the illustrated example, the concurrently selected geometric feature 316F30 is not included in the portion of the editable plan representation currently visible in the plan view window 310. The user interface 305 also includes a display of a context sensitive relational command menu 604 which may appear automatically or based on a user input as outlined previously, which indicates a valid set of relational commands for the concurrently selected geometric features 326F30 and 326F43. The context sensitive relational command menu 604 in this instance includes a "distance" measurement operation command 606C operable to define a distance measurement operation, with respect to the concurrently selected geometric features, to be included in the current workpiece feature inspection plan. In the illustrated example, the context sensitive relational command menu 604 is displayed as a submenu from a parent menu 603, though a particular manner in which the context sensitive relational command menu 604 is displayed is in no way limited to the illustrated implementation example. Note that the context sensitive relational command menu 604 does not include, for example, an angle measurement operation command or an intersection line feature construction command because no angle or intersection line can be formed between the concurrently selected geometric features 326F30 and 326F43 (parallel planes). Thus, these commands which were operational in the operating context or situation shown in FIGS. 6, 7 and 8, are invalid relational commands for the concurrently selected geometric features 326F30 and 326F43 in the operating context or situation shown in FIG. 9, as automatically determined by the geometric relationship analyzer 2702 of FIG. 2B for example.

As apparent from comparison between the context sensitive relational command menu 604 of FIG. 6 and that of FIG. 9, the valid set of relational commands including relational feature commands and relational measurement commands differs depending on an analysis of the relational features that are based on the concurrently selected geometric features. The valid set of relational commands may differ depending on a geometric relationship or spatial orientation between the concurrently selected geometric features.

In various implementations, the context sensitive relational command menu 604 is configured to indicate the valid set of relational commands by limiting the relational commands displayed in the context sensitive relational command menu 604 to the valid set only, as shown in FIGS. 6 and 9. Alternatively or additionally, both valid and invalid relational commands may be displayed in different respective formats in the context sensitive relational command menu 604. For example, the valid set may be highlighted while the invalid set is not highlighted in the context sensitive relational command menu 604. Further alternatively or additionally, invalid relational commands in the context sensitive relational command menu 604 may be rendered inoperable, such that user may view and select the invalid relational commands but the invalid relational commands are inoperable even if selected.

Note that for some concurrently selected geometric feature sets, the valid set may be empty and no relational measurement commands or relational feature commands are valid. In such cases the context sensitive relational command menu 604 indicates no valid set of relational commands. For example, the context sensitive relational command menu 604 may be displayed as a blank menu.

The prior art CMM programming systems provide a tool-bar user interface, in which all video tools (e.g., measurement operation tools, feature construction tools) are presented for user selection. In some embodiments of the CMM programming system according to the present disclosure, in at least one operating configuration, a complete list of relational commands (e.g., the prior art tool bar) operable to define a corresponding constructed feature or corresponding relational measurement operation between at least two geometric features is not displayed. The context sensitive relational command menu 604, which is displayed, includes only a first subset of valid relational commands from the complete list and excludes a second subset of invalid relational commands from the complete list.

In various implementations, the context sensitive relational command menu 604 is generated after two or more geometric features are concurrently selected and indicated in the user interface 305. In other implementations, it is possible to pre-form various context sensitive relational command menus 604 for various possible sets of concurrently selectable geometric features, any of which can then be called upon selection of a particular set of concurrently selected geometric features.

Figure 10:
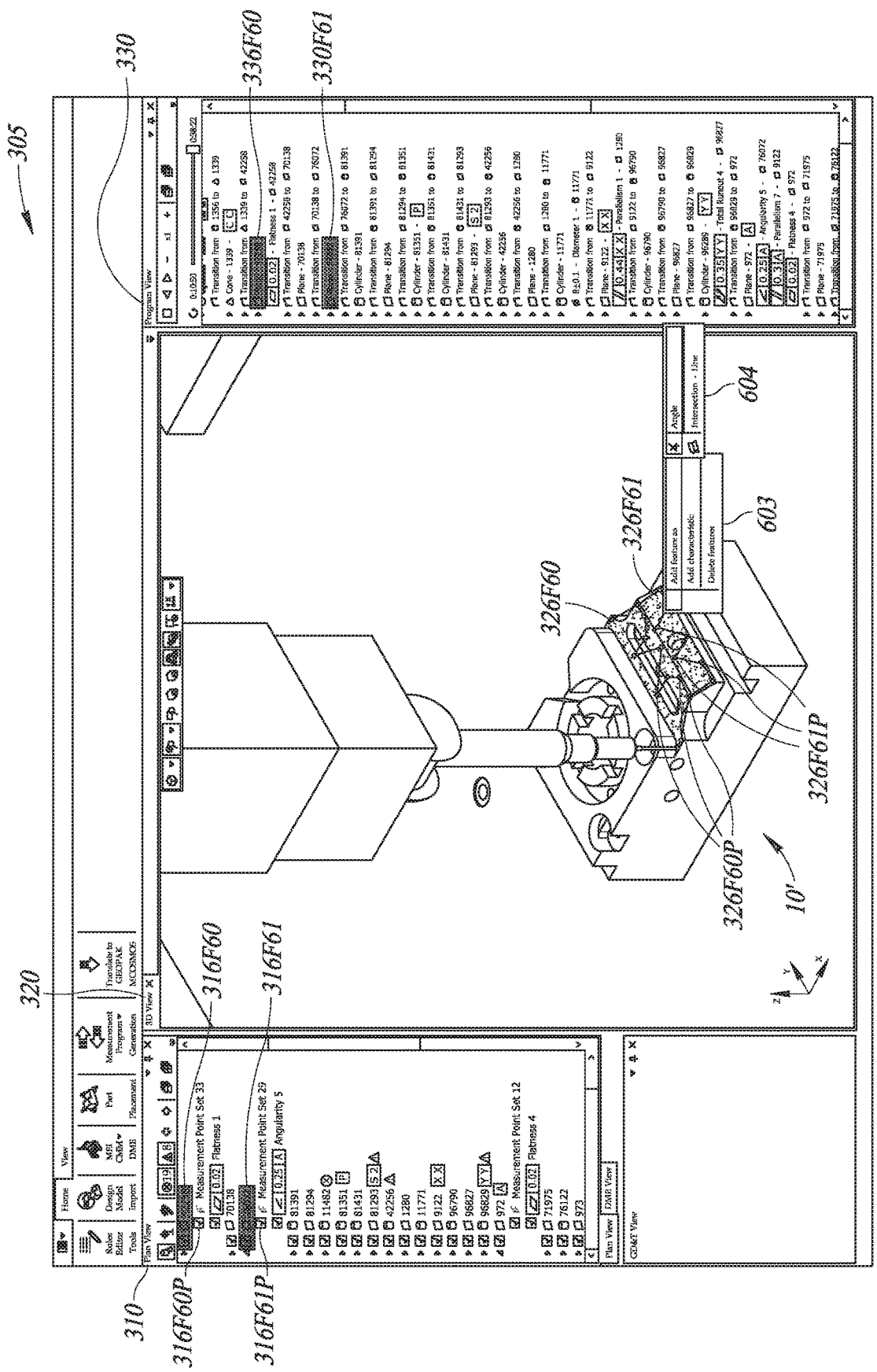
FIG. 10 is a diagram of the user interface in which an "intersection line" feature construction command is selected from a context sensitive relational command menu based on two concurrently selected geometric features (e.g., two adjacent surfaces, each defined by a set of feature measurement points).

FIG. 10 is a diagram of the user interface 305, in which two geometric features 326F60 (a first plane) and 326F61 (a second adjacent plane) are concurrently selected, and highlighted in the 3D view window 320. In the example of FIG. 10, sets of feature measurement points 326F60P and 326F61P (e.g. as automatically determined by various components of the CMM workpiece feature inspection operations programming portion 202) that are used to measure and characterize the associated geometric features are shown. Such feature measurement point sets may be hidden or displayed when a corresponding feature is selected, in various embodiments and/or display modes of the user interface. As illustrated, the concurrently selected geometric features 316F60 and 316F61 are also highlighted or otherwise marked in the editable plan representation in the plan view window 310. In the illustrated example, in connection with the geometric features 316F60 and 316F61, the set of feature measurement points 316F60P and 316F61P that respectively are measured and analyzed to define the geometric features 316F60 and 316F61 are represented in the current workpiece feature inspection plan in the plan view window 310. Further correspondingly, the concurrently selected geometric features 336F60 and 336F61 are highlighted or otherwise marked in the editable plan representation in the program view window 330 ("Program View"), in which the current workpiece feature inspection plan is organized as inspection program pseudo-code, actual code, or graphical program operation representations. The user interface 305 also includes a display of a context sensitive relational command menu 604, which indicates a valid set of relational commands for the concurrently selected geometric features 326F60 and 326F61, which may appear automatically or based on a user input, as outlined previously. The context sensitive relational command menu 604 in this instance includes an "angle" measurement operation command and an "intersection line" feature construction command (similar to FIG. 6) because these are a valid set of relational commands for the concurrently selected geometric features 326F60 and 326F61, i.e., a first plane surface and a second plane that intersect or meet each other. In the illustrated example, the context sensitive relational command menu 604 is displayed as a submenu from a parent menu 603, though a particular manner in which the context sensitive relational command menu 604 is displayed is not limited to the particular implementation example of FIG. 10. The user interface 305 also indicates that the user has selected the "intersection line" feature construction command from the context sensitive relational command menu 604, (e.g. by clicking on that command) as indicated by the "intersection line" feature construction command being highlighted.

Figure 11:
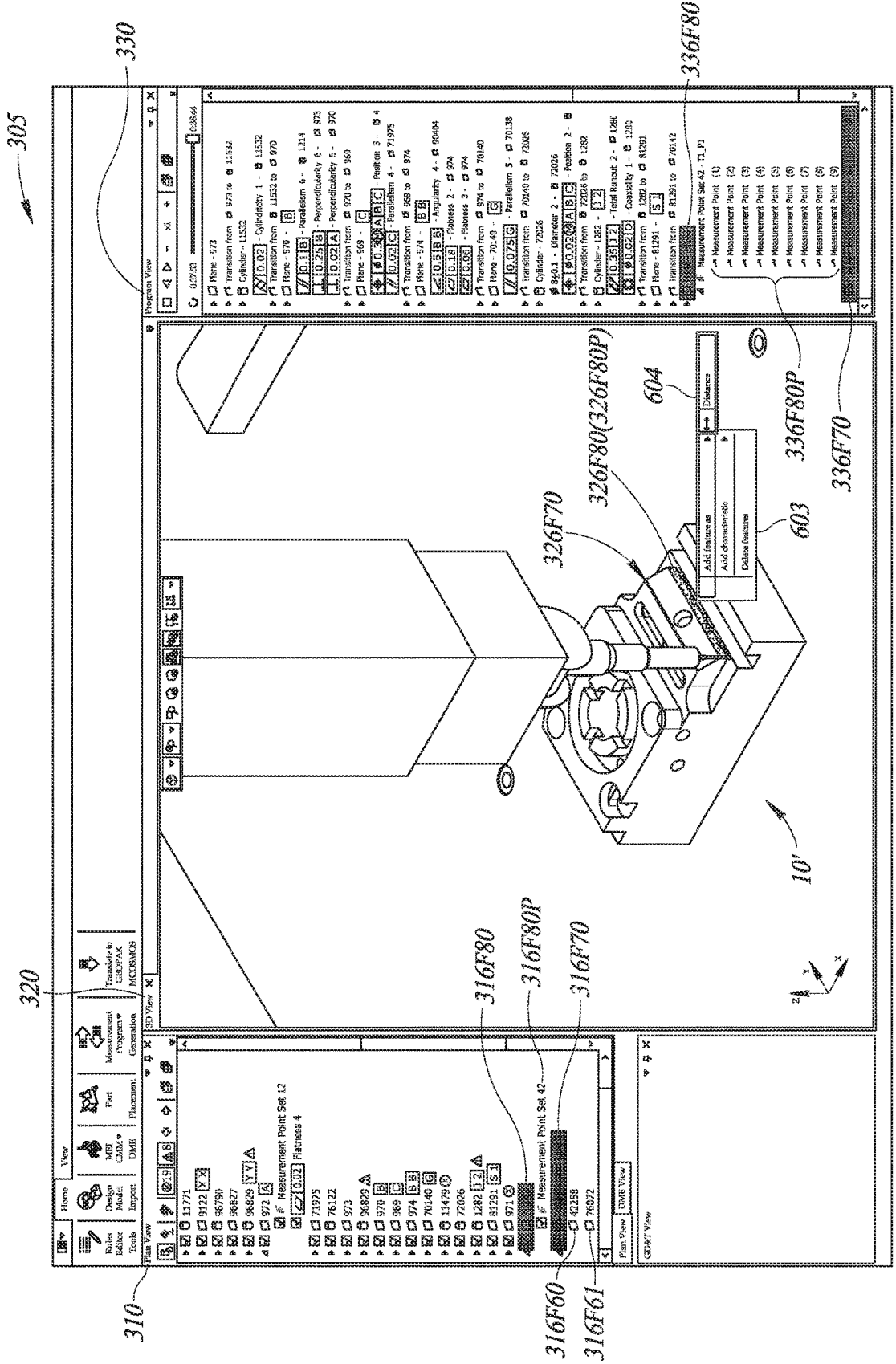
FIG. 11 is a diagram of the user interface in which the "intersection line" feature is constructed in response to selection of the "intersection line" feature construction command from the context sensitive relational command menu of FIG. 10 and selected, another geometric feature (a surface defined by a set of feature measurement points) is concurrently selected, and a context sensitive relational command menu based on the concurrently selected geometric features is displayed including a "distance" measurement operation command.

FIG. 11 is a diagram of the user interface 305, in which the "intersection line" feature, constructed in response to selection of the "intersection line" feature construction command from the context sensitive relation command menu 604 of FIG. 10, is added and displayed as a "constructed" or "relational" geometric feature 326F70. Further, the "intersection line" geometric feature 326F70 has been selected by a user in the operating state shown in FIG. 11. Concurrently, a geometric feature 326F80 (plane) defined by a corresponding set of feature measurement points 326F80P is also selected. Correspondingly, the concurrently selected geometric features 316F70 (i.e., the "intersection line" feature constructed from the geometric features 316F60 and 316F61) and 316F80 (i.e., the plane defined by the set of feature measurement points 316F80P) are highlighted or otherwise marked in the editable plan representation in the plan view window 310. Further correspondingly, the concurrently selected geometric features 336F70 and 336F80

(defined by the set of feature measurement points 336F80P) are highlighted or otherwise marked in the editable plan representation in the program view window 330. The user interface 305 also includes a display of a context sensitive relational command menu 604 (which may appear automatically or based on a user input, as outlined previously), which indicates a valid set of relational commands for the concurrently selected geometric features 326F70 and 326F80. The context sensitive relational command menu 604 in this instance includes a "distance" measurement operation command because it is a valid operation to measure a distance between the constructed "intersection line" feature 326F70 and the geometric feature 326F80, which is a plane separated and distanced, in parallel, from the constructed "intersection line" feature 326F70. The user interface 305 also indicates that the user has selected the "distance" measurement operation command from the context sensitive relational command menu 604, as indicated by the "distance" measurement command being highlighted.

Figure 12:
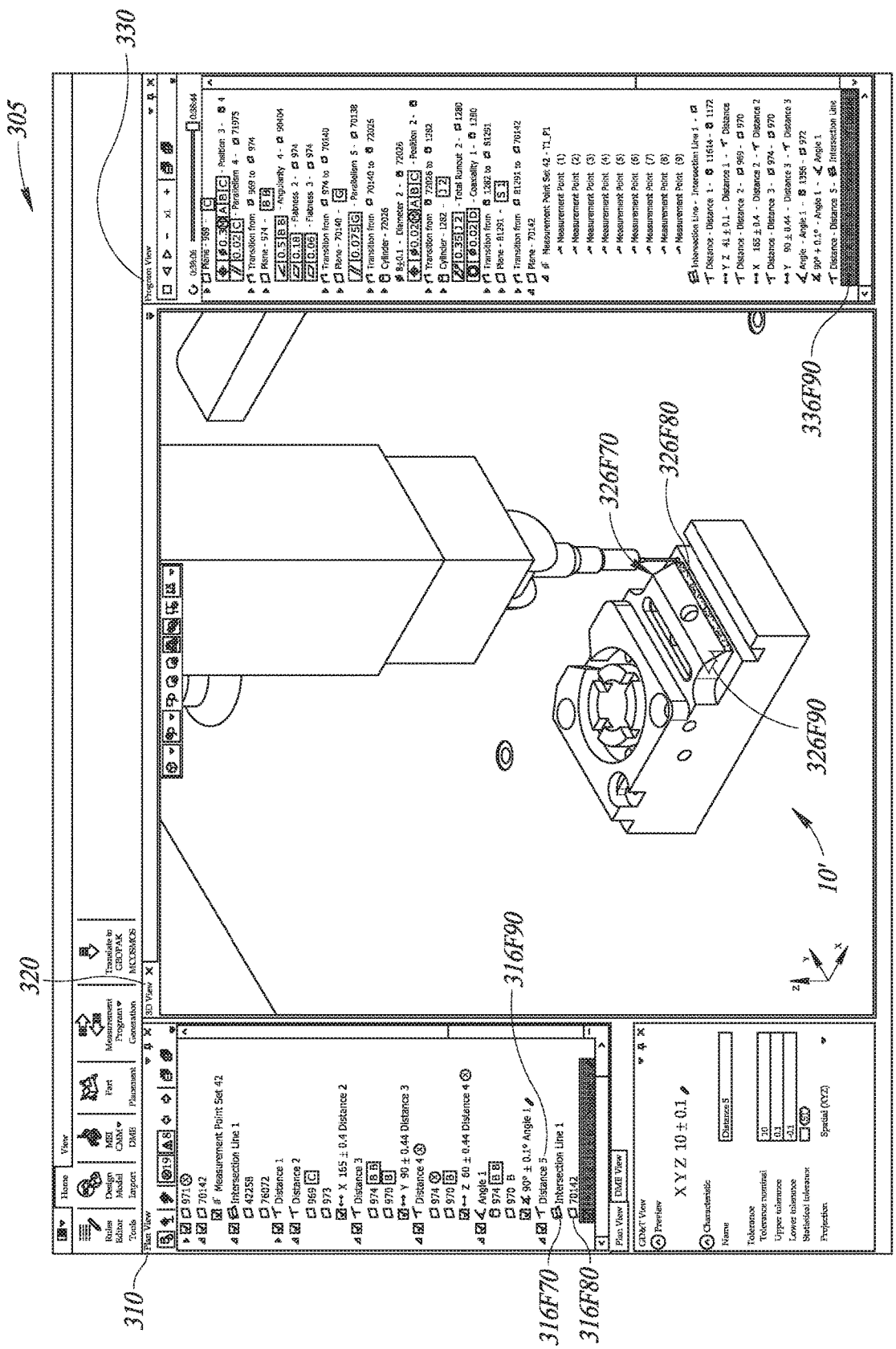
FIG. 12 is a diagram of the user interface updated in response to selection of the "distance" measurement operation command from the context sensitive relational command menu of FIG. 11, indicating that the distance measurement operation is added to the current workpiece feature inspection plan.

FIG. 12 is a diagram of the user interface 305, which is updated in response to selection of the "distance" measurement operation command from the context sensitive relational command menu 604 of FIG. 11, indicating that the distance measurement operation 326F90 is now added to the current workpiece feature inspection plan. Addition of the distance measurement operation 326F90 is graphically or otherwise indicated in the 3D view window 320. Correspondingly the distance measurement operation 316F90, operable to measure or compute a distance between the two concurrently selected geometric features 316F70 and 316F80, is added in the editable plan representation in the plan view window 310. Further correspondingly, the distance measurement operation 336F90, operable to measure a distance between the two concurrently selected geometric features 336F70 and 336F80 (not currently visible), is added in the editable plan representation in the program view window 330. Processing in response to selection of the "distance" measurement operation command, including incorporation of the distance measurement operation 316F90/326F90/336F90 into the current workpiece feature inspection plan and indication of the distance measurement operation 316F90/326F90/336F90 in the user interface 305, is performed, for example, by various components of the CMM workpiece feature inspection operations programming portion 202 and the associated portions and techniques described above in reference to FIG. 2A.

Figure 13:
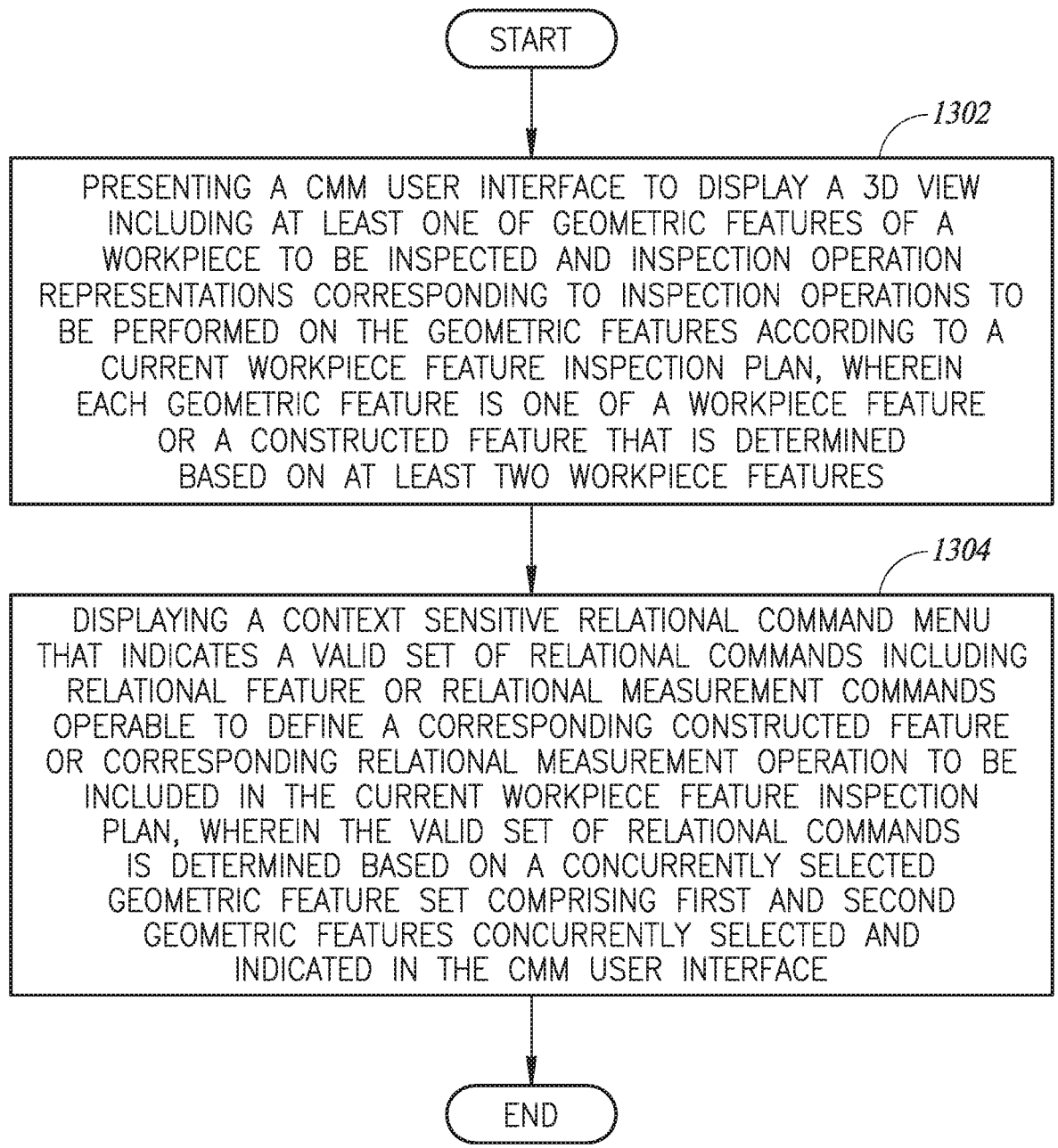
FIG. 13 is a flow diagram illustrating one exemplary implementation of a routine for programming workpiece feature inspection operations for a coordinate measuring machine (CMM), including use of a context sensitive relational command menu.

FIG. 13 is a flow diagram illustrating one exemplary implementation of a routine for programming workpiece feature inspection operations for a CMM, including use of a context sensitive relational command menu according to various exemplary embodiments.

At block 1302, a CMM user interface 305 is presented to display a 3D view window 320 including at least one of geometric features (316F/326F/336F) of a workpiece 10 to be inspected and inspection operation representations (316F/326F/336F) corresponding to inspection operations to be performed on the geometric features according to a current workpiece feature inspection plan. Each geometric feature (316F/326F/336F) is one of a workpiece feature or a constructed feature that is determined based on at least two workpiece features.

At block 1304, a context sensitive relational command menu 604 is displayed that indicates a valid set of relational commands including relational feature or relational measurement commands operable to define a corresponding constructed feature or corresponding relational measurement operation to be included in the current workpiece feature inspection plan. The valid set of relational commands is determined based on a concurrently selected geometric feature set including first and second geometric features concurrently selected and indicated in the CMM user interface 305.

As described and illustrated previously, the concurrently selected first and second geometric features may be displayed in a manner distinguishable from the rest of the workpiece in the 3D view (e.g., highlighted or otherwise marked).

In various exemplary implementations of the routine, the context sensitive relational command menu 604 is not be displayed in the user interface 305 before the first and second relational features are concurrently selected and indicated in the user interface 305.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

The invention claimed is:

1. A system for programming workpiece feature inspection operations for a coordinate measuring machine, the coordinate measuring machine (CMM) including at least one sensor used for determining workpiece feature measurement data, a stage for holding a workpiece wherein at least one of the sensor or the stage are movable relative to one another, and a CMM control portion, the system comprising:

a computer aided design (CAD) file processing portion which inputs or generates a workpiece CAD file corresponding to a workpiece and analyzes the file to automatically determine inspectable workpiece features on the workpiece corresponding to a plurality of geometric feature types;

a geometric relationship analyzer operable to perform geometric analysis operations, including geometric analysis operations usable to analyze relational features that are based on a geometric feature set comprising at least two geometric features, wherein each geometric feature is one of a workpiece feature or a constructed feature that is determined based on at least two workpiece features;

an inspection motion path generation portion that automatically generates at least part of an inspection motion path used in an inspection program generated by the system based on a current workpiece feature inspection plan for inspecting the workpiece represented by the workpiece CAD file; and a user interface comprising:
  an editable plan representation of the current workpiece feature inspection plan for the workpiece corresponding to the CAD file, the editable plan representation comprising at least one of geometric features and inspection operation representations;
  a workpiece inspection program simulation portion configured to display a 3D view including at least one of geometric features and inspection operation representations corresponding to inspection operations to be performed on geometric features according to the current workpiece feature inspection plan; and a context sensitive menu portion configured to display a context sensitive relational command menu that indicates a valid set of relational commands comprising relational feature or relational measurement commands operable to define a corresponding constructed feature or corresponding relational measurement operation to be included in the current workpiece feature inspection plan, wherein:

the valid set of relational commands is determined based on a concurrently selected geometric feature set comprising at least two geometric features concurrently selected and indicated in the user interface, wherein the at least two geometric features are selected by a user;

the geometric relationship analyzer performs an analysis to determine what relational commands are compatible with the concurrently selected at least two geometric features;

only relational commands that are determined to be compatible with the concurrently selected at least two geometric features are included in the valid set of relational commands;

for a first concurrently selected geometric feature set that comprises at least two geometric features that intersect:

the geometric relationship analyzer determines that an angle measurement command is compatible based on the at least two geometric features intersecting, for which the angle measurement command defines an angle measurement operation to measure an angle between the at least two geometric features that intersect;

the angle measurement command is correspondingly included in a first valid set of relational commands for the first concurrently selected geometric feature set; and the context sensitive menu portion displays a first context sensitive relational command menu that indicates the first valid set of relational commands for the first concurrently selected geometric feature set; and for a second concurrently selected geometric feature set that comprises at least two geometric features that are in parallel:

the geometric relationship analyzer determines that a distance measurement command is compatible based on the at least two geometric features being in parallel, for which the distance measurement command defines a distance measurement operation to measure a distance between the at least two geometric features that are in parallel;

the distance measurement command is correspondingly included in a second valid set of relational commands for the second concurrently selected geometric feature set;

the geometric relationship analyzer determines that an angle measurement command is not compatible based on the at least two geometric features being in parallel and is thus invalid and is not included in the second valid set of relational commands for the second concurrently selected geometric feature set; and the context sensitive menu portion displays a second context sensitive relational command menu that indicates the second valid set of relational commands for the second concurrently selected geometric feature set.

2. The system of claim 1, wherein each context sensitive relational command menu is configured to indicate the corresponding valid set of relational commands by at least one of: a) limiting the relational commands displayed in the context sensitive relational command menu to the valid set, b) presenting valid and invalid relational commands in different respective formats in the relational command menu, or c) making invalid relational commands inoperable in the relational command menu.

3. The system of claim 1, wherein each valid set of relational commands is determined and the corresponding context sensitive relational command menu is generated, after the geometric features of the corresponding geometric feature set are concurrently selected and indicated in the user interface.

4. The system of claim 3, wherein for some concurrently selected geometric feature sets the valid set is empty, and the corresponding context sensitive relational command menu indicates no valid set of relational commands.

5. The system of claim 1, wherein the workpiece features include one or more of lines, planes, circles, cylinders, spheres and cones, and the constructed features include one or more of a point of intersection, a line of intersection, a circle of intersection, an overlapping plane, an overlapping volume, and a concentric axis.

6. The system of claim 1, wherein in at least one operating configuration, a complete list of relational commands operable to define a corresponding constructed feature or corresponding relational measurement operation between at least two geometric features is not displayed; and the corresponding context sensitive relational command menu includes a first subset and excludes a second subset of the relational commands in the complete list wherein the first subset includes the one or more valid relational commands and the second subset excluded from the menu includes one or more invalid relational commands for the corresponding concurrently selected geometric feature set.

7. The system of claim 1, wherein a valid set of relational commands indicated in a context sensitive relational command menu differs depending on an analysis of the relational features that are based on a corresponding concurrently selected geometric feature set.

8. The system of claim 1, wherein a valid set of relational commands indicated in a context sensitive relational command menu differs depending on a spatial orientation between the at least two geometric features included in a corresponding concurrently selected geometric feature set.

9. The system of claim 1, wherein for the first concurrently selected geometric feature set, the first valid set of relational commands further includes an intersection definition command operable to define an intersection between the at least two geometric features that intersect as a constructed feature.

10. The system of claim 1, wherein in response to selection of a valid relational command from a context sensitive relational command menu, the 3D view is automatically updated to display an indication of the corresponding constructed feature or corresponding relational measurement operation included in the current workpiece feature inspection plan.

11. The system of claim 10, wherein in response to selection of a valid relational command from the context sensitive relational command menu, the editable plan representation is automatically updated to display a representation of the corresponding constructed feature or corresponding relational measurement operation included in the current workpiece feature inspection plan.

12. The system of claim 11, wherein the at least two geometric features of the first concurrently selected geometric feature set are concurrently selected either in the workpiece inspection program simulation portion displaying the 3D view or in the editable plan representation of the current workpiece feature inspection plan.

13. The system of claim 1, wherein:
the user interface further comprises a program view portion that displays the current workpiece feature inspection plan organized as inspection program pseudo-code, actual code, or graphical program operation representations, and
in response to selection of a valid relational command from a context sensitive relational command menu, the program view portion is automatically updated to display the workpiece feature inspection plan that incorporates the corresponding constructed feature or corresponding relational measurement operation.

14. The system of claim 1, wherein the geometric relationship operations of the geometric relationship analyzer comprise operations that analyze the at least two geometric features of the first concurrently selected geometric feature set, to determine a valid set of relational commands corresponding to a set of valid geometric relationships that can be determined between the at least two geometric features of the first concurrently selected geometric feature set.

15. A method for programming workpiece feature inspection operations for a coordinate measuring machine, the coordinate measuring machine (CMM) including at least one sensor used for determining workpiece feature measurement data, a stage for holding a workpiece wherein at least one of the sensor or the stage are movable relative to one another, and a CMM control portion, the method comprising:
providing a computer aided design (CAD) file processing portion which inputs or generates a workpiece CAD file corresponding to a workpiece and analyzes the file to automatically determine inspectable workpiece features on the workpiece corresponding to a plurality of geometric feature types;
providing a geometric relationship analyzer that performs geometric analysis operations, including geometric analysis operations usable to analyze relational features that are based on a geometric feature set comprising at least two geometric features, wherein each geometric feature is one of a workpiece feature or a constructed feature that is determined based on at least two workpiece features;
providing an inspection motion path generation portion that automatically generates at least part of an inspection motion path used in an inspection program generated by the system based on a current workpiece feature inspection plan for inspecting the workpiece represented by the workpiece CAD file; and
providing a user interface comprising:
an editable plan representation of the current workpiece feature inspection plan for the workpiece corresponding to the CAD file, the editable plan representation comprising at least one of geometric features and inspection operation representations;
a workpiece inspection program simulation portion displaying a 3D view including at least one of geometric features and inspection operation representations corresponding to inspection operations to be performed on geometric features according to the current workpiece feature inspection plan; and
a context sensitive menu portion displaying a context sensitive relational command menu that indicates a valid set of relational commands comprising relational feature or relational measurement commands that define a corresponding constructed feature or corresponding relational measurement operation to be included in the current workpiece feature inspection plan, wherein:
the valid set of relational commands is determined based on a concurrently selected geometric feature set comprising at least two geometric features concurrently selected and indicated in the user interface, wherein the at least two geometric features are selected by a user;
the geometric relationship analyzer performs an analysis to determine what relational commands are compatible with the concurrently selected at least two geometric features;
only relational commands that are determined to be compatible with the concurrently selected at least two geometric features are included in the valid set of relational commands;
for a first concurrently selected geometric feature set that comprises at least two geometric features that intersect:
the geometric relationship analyzer determines that an angle measurement command is compatible based on the at least two geometric features intersecting, for which the angle measurement command defines an angle measurement operation to measure an angle between the at least two geometric features that intersect;
the angle measurement command is correspondingly included in a first valid set of relational commands for the first concurrently selected geometric feature set; and
the context sensitive menu portion displays a first context sensitive relational command menu that indicates the first valid set of relational commands for the first concurrently selected geometric feature set; and
for a second concurrently selected geometric feature set that comprises at least two geometric features that are in parallel:
the geometric relationship analyzer determines that a distance measurement command is compatible based on the at least two geometric features being in parallel, for which the distance measurement command defines a distance measurement operation to measure a distance between the at least two geometric features that are in parallel;
the distance measurement command is correspondingly included in a second valid set of relational commands for the second concurrently selected geometric feature set;
the geometric relationship analyzer determines that an angle measurement command is not compatible based on the at least two geometric features being in parallel and is thus invalid and is not included in the second valid set of relational commands for the second concurrently selected geometric feature set; and the context sensitive menu portion displays a second context sensitive relational command menu that indicates the second valid set of relational commands for the second concurrently selected geometric feature set.

16. The method of claim 15, wherein each context sensitive relational command menu indicates the corresponding valid set of relational commands by at least one of: a) limiting the relational commands displayed in the context sensitive relational command menu to the valid set, b) presenting valid and invalid relational commands in different respective formats in the relational command menu, or c) making invalid relational commands inoperable in the relational command menu.

17. The method of claim 15, wherein each valid set of relational commands is determined and the corresponding context sensitive relational command menu is generated, after the geometric features of the corresponding geometric feature set are concurrently selected and indicated in the user interface.

18. The method of claim 15, wherein the workpiece features include one or more of lines, planes, circles, cylinders, spheres and cones, and the constructed features include one or more of a point of intersection, a line of intersection, a circle of intersection, an overlapping plane, an overlapping volume, and a concentric axis.

19. The method of claim 15, wherein in at least one operating configuration, a complete list of relational commands operable to define a corresponding constructed feature or corresponding relational measurement operation between at least two geometric features is not displayed; and the corresponding context sensitive relational command menu includes a first subset and excludes a second subset of the relational commands in the complete list wherein the first subset includes the one or more valid relational commands and the second subset excluded from the menu includes one or more invalid relational commands for the corresponding concurrently selected geometric feature set.

20. The method of claim 15, wherein a valid set of relational commands indicated in a context sensitive relational command menu differs depending on at least one of:

an analysis of the relational features that are based on a corresponding concurrently selected geometric feature set; or a spatial orientation between the at least two geometric features included in a corresponding concurrently selected geometric feature set.

21. The method of claim 15, wherein for the first concurrently selected geometric feature set:

the geometric relationship analyzer further determines that an intersection definition command is compatible based on the at least two geometric features intersecting, for which the intersection definition command defines an intersection between the at least two geometric features as a constructed feature; and the intersection definition command is correspondingly included as a relational feature command in the first valid set of relational commands for the first concurrently selected geometric feature set.

22. The method of claim 15, wherein:

in response to selection of a valid relational command from a context sensitive relational command menu, the 3D view is automatically updated to display an indication of the corresponding constructed feature or corresponding relational measurement operation included in the current workpiece feature inspection plan; and in response to selection of a valid relational command from the context sensitive relational command menu, the editable plan representation is automatically updated to display a representation of the corresponding constructed feature or corresponding relational measurement operation included in the current workpiece feature inspection plan.

23. The method of claim 15, wherein:

the user interface further comprises a program view portion that displays the current workpiece feature inspection plan organized as inspection program pseudo-code, actual code, or graphical program operation representations; and in response to selection of a valid relational command from a context sensitive relational command menu, the program view portion is automatically updated to display the workpiece feature inspection plan that incorporates the corresponding constructed feature or corresponding relational measurement operation.

24. The method of claim 15, wherein the at least two geometric features of the first concurrently selected geometric feature set are concurrently selected either in the workpiece inspection program simulation portion displaying the 3D view or in the editable plan representation of the current workpiece feature inspection plan.

25. The method of claim 15, wherein the geometric relationship operations of the geometric relationship analyzer comprise operations that analyze the at least two geometric features of the first concurrently selected geometric feature set, to determine a valid set of relational commands corresponding to a set of valid geometric relationships that can be determined between the at least two geometric features of the first concurrently selected geometric feature set.

* * * * *